US010045280B2

(12) United States Patent
Levy et al.

(10) Patent No.: US 10,045,280 B2
(45) Date of Patent: Aug. 7, 2018

(54) APPARATUS, SYSTEM AND METHOD OF DISCOVERY OVER A DIRECTIONAL WIRELESS COMMUNICATION BAND

(71) Applicant: INTEL IP CORPORATION, Santa Clara, CA (US)

(72) Inventors: Elad Levy, Rishon LeZion (IL); Solomon B. Trainin, Haifa (IL); Idan Maor, Tel Aviv (IL)

(73) Assignee: INTEL IP CORPORATION, Santa Clara, CA (US)

( * ) Notice: Subject to any disclaimer, the term of this patent is extended or adjusted under 35 U.S.C. 154(b) by 127 days.

(21) Appl. No.: 15/281,096

(22) Filed: Sep. 30, 2016

(65) Prior Publication Data

US 2017/0265122 A1    Sep. 14, 2017

Related U.S. Application Data

(60) Provisional application No. 62/307,734, filed on Mar. 14, 2016.

(51) Int. Cl.
| | | |
|---|---|---|
| *H04W 48/10* | (2009.01) | |
| *H04W 8/26* | (2009.01) | |
| *H04W 48/16* | (2009.01) | |
| *H04W 88/08* | (2009.01) | |

(52) U.S. Cl.
CPC ............ *H04W 48/10* (2013.01); *H04W 8/26* (2013.01); *H04W 48/16* (2013.01); *H04W 88/08* (2013.01)

(58) Field of Classification Search
CPC ..... H04W 48/10; H04W 48/16; H04W 88/08; H04W 8/26

USPC ......................................................... 370/338
See application file for complete search history.

(56) References Cited

U.S. PATENT DOCUMENTS

| | | | |
|---|---|---|---|
| 2006/0111103 A1* | 5/2006 | Jeong .................... | H04W 48/14 455/434 |
| 2010/0157955 A1* | 6/2010 | Liu ...................... | H04W 74/002 370/336 |
| 2011/0149798 A1 | 6/2011 | Cordeiro et al. | |
| 2013/0044695 A1 | 2/2013 | Xu et al. | |
| 2014/0169288 A1 | 6/2014 | Cordeiro | |
| 2015/0117435 A1 | 4/2015 | Baldemair et al. | |
| 2015/0244432 A1* | 8/2015 | Wang ................... | H04B 7/0695 375/267 |

(Continued)

FOREIGN PATENT DOCUMENTS

WO         2015099750         7/2015

OTHER PUBLICATIONS

International Search Report and Written Opinion for PCT/US2017/017581, dated May 19, 2017, 15 pages.

(Continued)

*Primary Examiner* — Robert Lopata
(74) *Attorney, Agent, or Firm* — Shichrur & Co.

(57) ABSTRACT

For example, a first wireless station may be configured to transmit a beacon frame over a directional wireless communication band during a Beacon Transmission Interval (BTI), the beacon frame including a field including a type value to indicate a type of one or more wireless stations to respond to the beacon frame; and to process a Sector Sweep (SSW) frame from a second wireless station of a type corresponding to the type value during an Association Beamforming Training (A-BFT) period following the BTI.

25 Claims, 7 Drawing Sheets

(56) References Cited

U.S. PATENT DOCUMENTS

| | | | | |
|---|---|---|---|---|
| 2017/0026099 A1* | 1/2017 | Levy | .................... | H04B 7/0617 |
| 2017/0064583 A1* | 3/2017 | Roy | .................. | H04W 36/0005 |
| 2017/0086211 A1* | 3/2017 | Sahin | .................... | H04W 74/04 |
| 2017/0111099 A1* | 4/2017 | Jo | ........................ | H04B 7/0684 |
| 2017/0118656 A1* | 4/2017 | Xin | ...................... | H04W 16/28 |
| 2017/0126303 A1* | 5/2017 | Jo | ........................ | H04B 7/0684 |
| 2017/0134145 A1* | 5/2017 | Xin | ...................... | H04L 1/0009 |
| 2017/0207837 A1* | 7/2017 | Kim | .................... | H04B 7/0604 |
| 2017/0289274 A1* | 10/2017 | Levy | ...................... | H04L 67/16 |
| 2017/0302349 A1* | 10/2017 | Sun | ....................... | H04W 76/10 |
| 2017/0352954 A1* | 12/2017 | Abdallah | ................. | H01Q 3/34 |
| 2017/0353923 A1* | 12/2017 | Trainin | ............. | H04W 52/0216 |
| 2017/0353984 A1* | 12/2017 | Abdallah | ............ | H04B 7/0617 |

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

Wi-Fi Peer-to-Peer (P2P), Technical Specification, Version 1.5, 2014, Aug. 4, 2014, 183 pages.

\* cited by examiner

Fig. 3

APPARATUS, SYSTEM AND METHOD OF DISCOVERY OVER A DIRECTIONAL WIRELESS COMMUNICATION BAND

CROSS REFERENCE

This application claims the benefit of and priority from U.S. Provisional Patent Application No. 62/307,734 entitled "Apparatus, System and Method of Active Scanning Over a Directional Wireless Communication Band", filed Mar. 14, 2016, the entire disclosure of which is incorporated herein by reference.

TECHNICAL FIELD

Embodiments described herein generally relate to discovery over a directional wireless communication band.

BACKGROUND

A wireless communication network in a millimeter-wave band may provide high-speed data access for users of wireless communication devices.

There is a technical need for a discovery procedure to allow a device to discover and/or connect to another device over a directional wireless communication band, e.g., in an efficient manner.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 3 is a schematic illustration of a Sector Sweep (SSW) Feedback field of an SSW frame, in accordance with some demonstrative embodiments.

DETAILED DESCRIPTION

Figure 1:
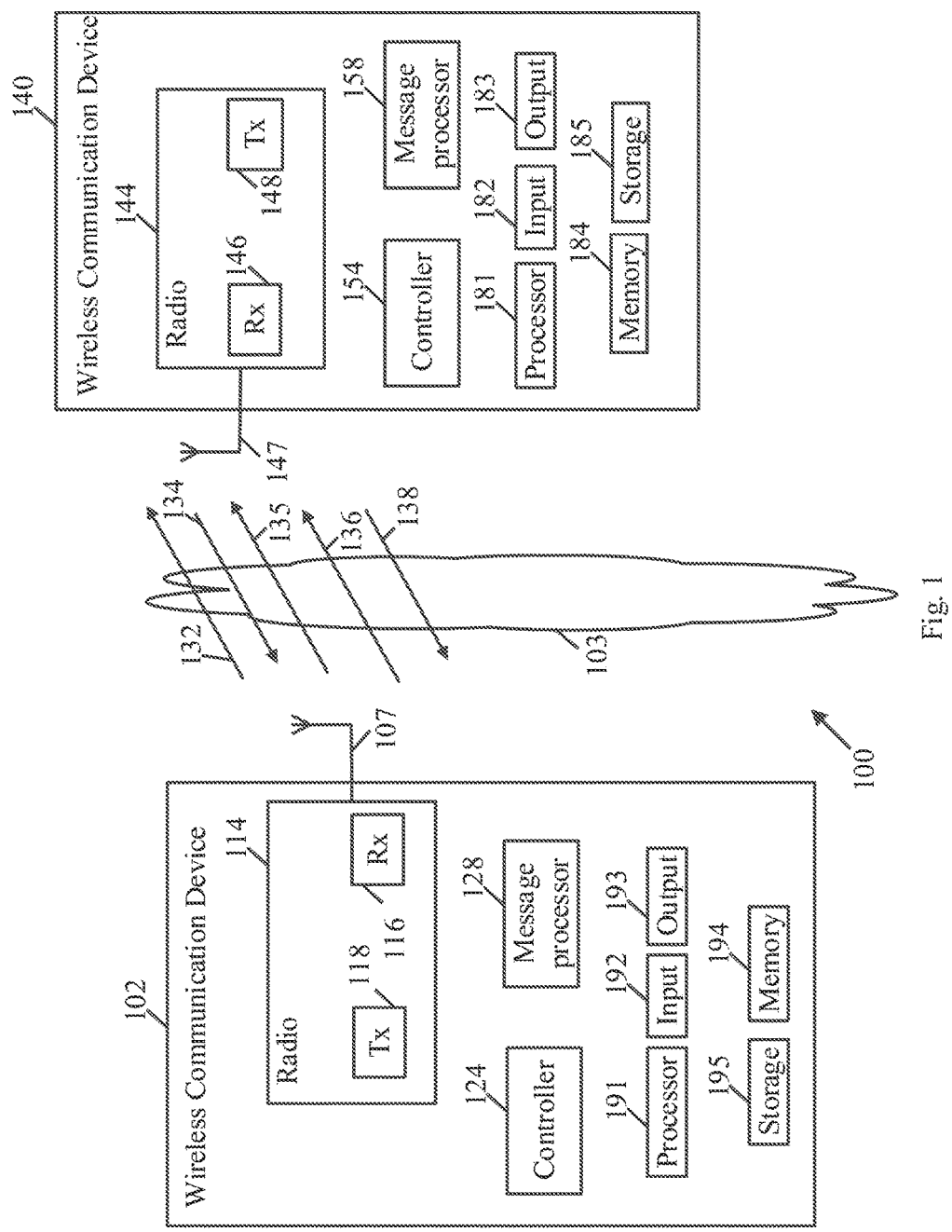
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2012 (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications,* Mar. 29, 2012); IEEE802.11ac-2013 (*"IEEE P802.11ac-2013, IEEE Standard for Information Technology—Telecommunications and Information Exchange Between Sys-* tems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("*IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band*", 28 Dec., 2012); IEEE-802.11REVmc ("*IEEE 802.11-REVmc™/ D6.0, June 2016, draft standard for Information technology—Telecommunications and information exchange between systems Local and metropolitan area networks Specific requirements; Part 11: Wireless LAN Medium Access Control (MAC) and Physical Layer (PHY) Specification*"); IEEE 802.11ax (*IEEE 802.11ax, High Efficiency WLAN (HEW)*); IEEE802.11-ay (*P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment:—Enhanced Throughput for Operation in License-Exempt Bands Above 45 GHz*)) and/or future versions and/or derivatives thereof) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version 1.1, April* 2011, *Final specification*) and/or future versions and/or derivatives thereof, devices and/or networks operating in accordance with existing Wireless Fidelity (WiFi) Alliance (WFA) Peer-to-Peer (P2P) specifications (*WiFi P2P technical specification, version* 1.5, *Aug.* 4, 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, devices and/or networks operating in accordance with existing Bluetooth (BT) specifications and/or protocols and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a frequency band above 45 GHZ, a frequency band below 20 GHZ, e.g., a Sub 1 GHZ (S1G) band, a 2.4 GHz band, a 5 GHZ band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., 7 Gigabit per second, or any other rate.

Some demonstrative embodiments may be implemented by a DMG STA (also referred to as a "mmWave STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a first wireless communication device 102, and/or a second wireless communication device 140.

In some demonstrative embodiments, devices 102 and/or 140 may include a mobile device or a non-mobile, e.g., a static, device.

For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication device 102 and/or device 140 may be capable of communicating content, data, information and/or signals via a wireless medium (WM) 103. In some demonstrative embodiments, wireless medium 103 may include, for example, a radio channel, a cellular channel, an RF channel, a WiFi channel, an IR channel, a Bluetooth (BT) channel, a Global Navigation Satellite System (GNSS) Channel, and the like.

In some demonstrative embodiments, WM 103 may include one or more directional bands and/or channels. For example, WM 103 may include one or more millimeter-wave (mmWave) wireless communication bands and/or channels.

In some demonstrative embodiments, WM 103 may include one or more DMG channels. In other embodiments WM 103 may include any other directional channels.

In some demonstrative embodiments, device 102 and/or device 140 may include one or more radios including a circuitry and/or logic to perform wireless communication between devices 102, 140 and/or one or more other wireless communication devices. For example, device 102 may include at least one radio 114, and/or device 140 may include at least one radio 144.

In some demonstrative embodiments, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radio 114 and/or radio 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a directional band, for example, a mmWave band, and/or any other band, for example, a 2.4 GHz band, a 5 GHz band, a S1G band, and/or any other band.

In some demonstrative embodiments, radio 114 and/or radio 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include a directional antenna, which may be configured to be steered to a plurality of beam directions.

In some demonstrative embodiments, device 102 may include a controller 124, and/or device 140 may include a controller 154. Controllers 124 and/or 154 may be configured to perform one or more communications, may generate and/or communicate one or more messages and/or transmissions, and/or may perform one or more functionalities, operations and/or procedures between devices 102, 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, device 102 and/or device 140 may include, operate as, perform the role of, and/or perform one or more functionalities of, one or more STAs. For example, device 102 may include at least one STA, and/or device 140 may include at least one STA.

In some demonstrative embodiments, device 102 and/or device 140 may include, operate as, perform the role of, and/or perform one or more functionalities of, one or more DMG STAs. For example, device 102 may include, operate as, perform the role of, and/or perform one or more functionalities of, at least one DMG STA, and/or device 140 may include, operate as, perform the role of, and/or perform one or more functionalities of, at least one DMG STA.

In other embodiments, devices 102 and/or 140 may include, operate as, perform the role of, and/or perform one or more functionalities of, any other wireless device and/or station, e.g., a WLAN STA, a WiFi STA, and the like.

In some demonstrative embodiments, device 102 and/or device 140 may be configured operate as, perform the role of, and/or perform one or more functionalities of, an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, device 102 and/or device 140 may be configured to operate as, perform the role of, and/or perform one or more functionalities of, a non-AP STA, e.g., a DMG non-AP STA, and/or a non-PCP STA, e.g., a DMG non-PCP STA, for example, a non-AP/PCP STA, e.g., a DMG non-AP/PCP STA.

In other embodiments, device 102 and/or device 140 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments, devices 102 and/or 140 may be configured to operate in accordance with one or more Specifications, for example, including, one or more IEEE 802.11 Specifications, e.g., an IEEE 802.11ad Specification, an IEEE 802.11REVmcSpecification, an IEEE 802.11ay Specification, and/or any other specification and/or protocol.

Some demonstrative embodiments may be implemented, for example, as part of a new standard in an mmWave band, e.g., a 60 GHz frequency band or any other directional band, for example, as an evolution of an IEEE 802.11ad Specification.

In some demonstrative embodiments, devices 102 and/or 140 may be configured according to one or more standards, for example, in accordance with an IEEE 802.11 ay Standard, which may be, for example, configured to enhance the efficiency and/or performance of an IEEE 802.11ad Specification, which may be configured to provide Wi-Fi connectivity in a 60 GHz band.

Some demonstrative embodiments may enable, for example, to significantly increase data transmission rates defined in the IEEE 802.11ad specification, which may, for example, satisfy growing demand in network capacity for new coming applications.

Some communications over a wireless communication band, for example, a DMG band or any other band, may be performed over a single channel bandwidth (BW). For example, the IEEE 802.11ad Specification defines a 60 GHz system with a single channel bandwidth (BW) of 2.16 GHz, which is to be used by all Stations (STAs) for both transmission and reception.

In some demonstrative embodiments, device 102 and/or device 140 may be configured to implement one or more mechanisms, which may, for example, enable to extend a single-channel BW scheme, e.g., a scheme in accordance with the IEEE 802.11ad Specification or any other scheme, for higher data rates and/or increased capabilities, e.g., as described below.

In some demonstrative embodiments, device 102 and/or device 140 may be configured to implement one or more channel bonding mechanisms, which may, for example, support communication over bonded channels.

In some demonstrative embodiments, the channel bonding mechanisms may include, for example, a mechanism and/or an operation whereby two or more channels can be combined, e.g., for a higher bandwidth of packet transmission, for example, to enable achieving higher data rates, e.g., when compared to transmissions over a single channel. Some demonstrative embodiments are described herein with respect to communication over a bonded channel, however other embodiments may be implemented with respect to communications over a channel, e.g., a "wide" channel, including or formed by two or more channels, for example, an aggregated channel including an aggregation of two or more channels.

In some demonstrative embodiments, device 102 and/or device 140 may be configured to implement one or more channel bonding mechanisms, which may, for example, support an increased channel bandwidth, for example, a channel BW of 4.32 GHz, a channel BW of 6.48 GHz, and/or any other additional or alternative channel BW.

In some demonstrative embodiments, devices 102 and/or 140 may be configured to communicate over a Next Generation 60 GHz (NG60) network, an Extended DMG (EDMG) network, and/or any other network. For example, devices 102 and/or 140 may be configured to use channel bonding, for example, for communicating over the NG60 and/or EDMG networks.

Some Specifications, e.g., an IEEE 802.11ad Specification, may be configured to support a Single User (SU) system, in which a Station (STA) cannot transmit frames to more than a single STA at a time. Such Specifications may not be able, for example, to support a STA transmitting to multiple STAs simultaneously, for example, using a multi-user MIMO (MU-MIMO) scheme, e.g., a downlink (DL) MU-MIMO, or any other MU scheme.

In some demonstrative embodiments, devices 102 and/or 140 may be configured to implement one or more Multi-User (MU) mechanisms. For example, devices 102 and/or 140 may be configured to implement one or more MU mechanisms, which may be configured to enable MU communication of Downlink (DL) frames using a Multiple-Input-Multiple-Output (MIMO) scheme, for example, between a device, e.g., device 102, and a plurality of devices, e.g., including device 140 and/or one or more other devices.

In some demonstrative embodiments, devices 102 and/or 140 may be configured to communicate over a Next Generation 60 GHz (NG60) network, an Extended DMG (EDMG) network, and/or any other network. For example, devices 102 and/or 140 may be configured to communicate MIMO, e.g., DL MU-MIMO, transmissions and/or use channel bonding, for example, for communicating over the NG60 and/or EDMG networks.

In some demonstrative embodiments, devices 102 and/or 140 may be configured to support one or more mechanisms and/or features, for example, channel bonding, single user (SU) MIMO, and/or and multi user (MU) MIMO, for example, in accordance with an IEEE 802.11 ay Standard and/or any other standard and/or protocol.

In some demonstrative embodiments, devices 102 and/or 140 may include, operate as, perform a role of, and/or perform the functionality of, one or more EDMG STAs. For example, device 102 may include, operate as, perform a role of, and/or perform the functionality of, at least one EDMG STA, and/or device 140 may include, operate as, perform a role of, and/or perform the functionality of, at least one EDMG STA.

In one example, an EDMG STA may include a DMG STA whose radio transmitter is capable of transmitting and receiving EDMG Physical Layer Convergence Procedure (PLCP) Protocol Data Units (PPDUs). The EDMG STA may perform any other additional or alternative functionality.

In some demonstrative embodiments, devices 102 and/or 140 may include EDMG STAs capable of communicating in an EDMG BSS.

In some demonstrative embodiments, devices 102 and/or 140 may be configured to communicate according to a channel access scheme, for example, a DMG channel access scheme, which may utilize beacon intervals. For example, a Beacon Interval (BI) may include a number of time units between target beacon transmission times. For example, a BI may include plurality of access periods, for example, including a Beacon Transmission Interval (BTI), an Association Beamforming Training (A-BFT) period, and/or one or more other additional or alternative access periods.

For example, the BTI may include a time period during which one or more DMG beacons may be transmitted. For example, the BTI may include an interval between the start of a first DMG beacon transmission by a DMG STA in a beacon interval to an end of a last DMG beacon transmission by the DMG STA in the same beacon interval.

For example, the A-BFT may include an access period, during which beamforming training may be performed with a STA that transmitted a DMG Beacon frame during a preceding BTI. In one example, the A-BFT may include an access period following the beamforming transmission, in which one or more STAs may be allowed to respond, e.g., using a sector sweep (SSW), to beacons transmitted during the BTI.

For example, a Sector Sweep (SSW) may include a transmission or a reception of one or more SSW frames via different sectors, in which a sweep is performed between consecutive receptions and/or transmissions. For example, a sweep may include a sequence of transmissions, e.g., separated by a short beamforming inter frame space interval or any other interval, in which an antenna configuration at a transmitter and/or a receiver is changed between transmissions. For example, a "sector" may include a transmitter and/or a receiver antenna pattern corresponding to a particular sector, e.g., a sector identifier (ID).

In other embodiments, devices 102 and/or 140 may be configured to communicate according to any other additional or alternative channel access scheme including one or more additional or alternative access periods.

In some demonstrative embodiments, devices 102 and/or 140 may be configured to perform one or more operations of a discovery procedure, for example, an active scanning, over a directional frequency band, for example, a DMG band, e.g., as described below.

In some demonstrative embodiments, devices 102 and/or 140 may be configured to utilize one or more operations of discovery procedure, for example, an active scanning procedure, which may be, for example, in compliance with an IEEE 802.11 Specification, for example, in compliance with an Active scanning procedure for a DMG STA, e.g., as defined by the IEEE 802.11REVmc Specification, and/or in compliance with any other additional specification, standard and/or protocol.

In some demonstrative embodiments, a first device, e.g., device 102, may be configured to operate as an initiator device of an active scanning procedure, and a second device, e.g., device 140, may be configured to operate as a responder of the active scanning procedure.

Some active scanning procedures may not be effective and/or may suffer one or more inefficiencies and/or disadvantages, for example, in some implementations, use cases and/or scenarios.

In some demonstrative embodiments, according to an active scanning procedure, the initiator device may send one or more DMG beacons, the responder device may send one or more SSW frames, for example, during an A-BFT, which may be allocated by the initiator device, and the initiator and responder devices may complete the active scanning procedure, for example, by an exchange of a probe request and/or a probe response between the initiator and responder devices.

In some demonstrative embodiments, in some cases, the initiating device may perform selective discovery, for example, to selectively discover one or more devices based on one or more criteria. For example, in some cases, the initiating device may search for one or more specific device types, e.g., only AP/PCP devices, only WFA P2P devices, only one or more types of WFA P2P devices, only non-AP/PCP devices; and/or in some cases, the initiating device may be looking for ne or more specific devices, for example, devices belonging to a specific Service Set (SS), e.g., devices utilizing a specific Service Set Identifier (SSID) value. In other examples, the initiating device may search for any other type of devices and/or based on any other criteria.

In some demonstrative embodiments, it may disadvantageous and/or inefficient to signal the "selective discovery" only by a specific probe request message content, e.g., an SSID field, which may enable devices not matching the specific criteria currently to select not to respond with a probe response message.

For example, a situation, in which the "selective discovery" is only signaled by the specific probe request message content, may result in a partial active scan, for example, as a device, which did respond to a DMG beacon with a SSW, may avoid from sending a probe response in response to the probe request. Such a situation may have one or more implications, disadvantages and/or inefficiencies.

In one example, such a situation of a partial active scan may result in additional power consumption on both the initiating device and the responding device, e.g., since both the initiating device and the responding device may consume power over their attempts to deliver messages, e.g., the SSW frames and/or the probe request frame, while the devices may not actually be interested in connecting with each other.

In another example, such a situation of a partial active scan may result in the device sending the probe request and not receiving the probe-response spending additional power in sending probe-request retries.

In another example, such a situation of a partial active scan may result in a waste of over-the-air link resources, for example, as the device responding with the SSW over the A-BFT may prevent other devices in range from using the same A-BFT allocation.

In some demonstrative embodiments, the situation, in which the probe request message is communicated after the communication of the DMG beacon and SSW frames, may occur in an active scanning over a directional frequency band, e.g., a DMG band, for example, in opposed to an active scan procedure over a non-directional band.

For example, an active scan procedure over a non-directional band may start with a probe request frame sent to a broadcast address. Accordingly, the initiating device may become aware of devices that are in range only based on probe response frames received, and, accordingly, there may be no need for re-transmission of the probe request.

In some demonstrative embodiments, devices 102 and/or 140 may be configured to communicate discovery information, which may allow at least supporting "selective discovery", e.g., over a directional frequency band, for example, earlier in an active scan flow, for example, even before communicating the probe request and/or probe response messages, e.g., as described below.

In some demonstrative embodiments, devices 102 and/or 140 may be configured to perform one or more operations of an active scanning, which may be configured, for example, to allow avoiding a situation in which the active scan is only partially executed and/or halted, for example, after transmission of a probe request and without communication of a probe response, e.g., as described below.

In some demonstrative embodiments, devices 102 and/or 140 may be configured to communicate, e.g., during a BTI, a DMG beacon including a field, which may include an indication of a type of one or more wireless stations, which are to be allowed to respond to the beacon frame, e.g., as described below. For example, a receiver of a DMG beacon including the field may be configured to select not to respond to the DMG beacon, for example, during an A-BFT following the BTI, for example, if the type indicated by the DMG beacon does not match a configuration of the receiver, e.g., as described below.

In some demonstrative embodiments, device 102 may be configured to transmit a beacon frame 132 over a directional wireless communication band, e.g., a DMG band, for example, during a BTI.

In some demonstrative embodiments, controller 124 may be configured to control, cause and/or trigger a STA implemented by device 102, e.g., a DMG STA, to transmit the beacon frame 132 during the BTI.

In some demonstrative embodiments, the beacon frame 132 may include a field including a type value to indicate a type of one or more wireless stations to respond to the beacon frame 132, e.g., as described below. For example, message processor 128 may be configured to generate the beacon frame 132 including the field including the type value.

In some demonstrative embodiments, the beacon frame 132 may include a discovery beacon frame, which may be communicated, for example, as part of a discovery, for example, for an active scan, e.g., as described below.

In some demonstrative embodiments, controller 124 may be configured to control, cause and/or trigger the STA implemented by device 102 to transmit the beacon frame 132 during an active scan.

In some demonstrative embodiments, the type value may include a value to indicate an AP station is to respond to the beacon frame 132, e.g., as described below.

In some demonstrative embodiments, the type value may include a value to indicate a non-AP station is to respond to the beacon frame 132, e.g., as described below.

In some demonstrative embodiments, the type value may include a value to indicate a Peer-to-Peer (P2P) Group Owner (GO) is to respond to the beacon frame 132, e.g., as described below.

In some demonstrative embodiments, the type value may include a value to indicate a P2P device is to respond to the beacon frame 132, e.g., as described below.

In other embodiments, the type value may include any other additional or alternative value to indicate any additional or alternative type of station or device to respond to the beacon frame 132.

In some demonstrative embodiments, the type value may include a Service Set (SS) value, which may be configured to indicate the type of the one or more wireless stations to respond to the beacon frame 132, e.g., as described below. In other embodiments, the type value may include any other value and/or information, which may be configured to indicate the type of the one or more wireless stations to respond to the beacon frame 132.

In some demonstrative embodiments, device 140 may be configured to process the beacon frame 132 from device 102. For example, controller 154 may be configured to control, cause and/or trigger a STA implemented by device 140, e.g., a DMG STA, to process the beacon frame 132 over the directional wireless communication band, e.g., during the BTI. For example, message processor 158 may be configured to access and/or process the type value in the beacon frame 132 indicating the type of one or more wireless stations to respond to the beacon frame 132.

In some demonstrative embodiments, controller 154 may be configured to control, cause and/or trigger the STA implemented by device 140 to, based on the type value in beacon frame 132, select whether to allow the STA implemented by device 140 to transmit a SSW frame 134 to the STA implemented by device 102, for example, during an A-BFT period following the BTI, e.g., as described below. For example, the beacon frame 132 may be transmitted in a BTI of a beacon interval, and the A-BFT period may follow the BTI in the same beacon interval.

In some demonstrative embodiments, controller 154 may be configured to allow the STA implemented by device 140 to transmit the SSW frame 134 to the second wireless during the A-BFT, for example, when a type of the STA implemented by device 140 corresponds to the type value in the beacon frame 132, e.g., as described below.

In some demonstrative embodiments, controller 154 may be configured to select not to allow the STA implemented by device 140 to transmit the SSW frame 134 to the STA implemented by device 102 during the A-BFT, for example, when the type of the STA implemented by device 140 does not correspond to the type value in the beacon frame 132, and/or based on one or more additional or alternative criteria, e.g., as described below.

In some demonstrative embodiments, controller 124 may be configured to control, cause and/or trigger the STA implemented by device 102 to process at least one SSW frame from at least one wireless station of a type corresponding to the type value in the beacon frame, for example, during the A-BFT period following the BTI in which the beacon frame 132 was transmitted.

In some demonstrative embodiments, device 102 may receive the SSW frame 134 from device 140 during the A-BFT following the BTI in which the beacon frame 132 was transmitted, e.g., when the type of the STA implemented by device 140 corresponds to the type value in the beacon frame 132.

In some demonstrative embodiments, a STA receiving a DMG beacon with the type value, e.g., the STA implemented by device 140, may be allowed to respond with one or more SSW frames, e.g., SSW frame 134, for example, over a following A-BFT allocation, e.g., in the sane beacon interval, for example, if a configuration for the STA receiving the DMG beacon matches and/or complies with the type value in the received DMG beacon.

In some demonstrative embodiments, a STA receiving a DMG beacon with the type value may be allowed to respond with SSW frames over a following A-BFT allocation, if, e.g., only if, the configuration for the STA receiving the SMG beacon matches and/or complies with the type value in the received DMG beacon.

In some demonstrative embodiments, a device, e.g., device 140, may be configured to selectively respond to a DMG beacon, e.g., beacon frame 132, for example, based on the type value included in the DMG beacon. For example, device 140 may be configured to select to respond to a DMG beacon 132 including a first type value, and to select not to respond to a DMG beacon, which does not include the first type value, or which includes a second type value, different from the first type value.

In some demonstrative embodiments, the STA receiving the DMG beacon, e.g., the STA implemented by device 140, may be allowed to answer a DMG beacon, e.g., beacon frame 134, for example, if the type value in the DMG beacon includes one or more predefined values.

In some demonstrative embodiments, devices 102 and/or 140 may be configured to communicate a DMG beacon, e.g., beacon frame 132, including a field, e.g., a SS field, which may include SS information, for example, information of an SSID field in a Probe request frame and/or any other SS value, e.g., as described below. For example, a receiver of a DMG beacon including the SS field, e.g., device 140, may be configured to select not to respond to the DMG beacon, for example, if a desired STA configuration indicated by the SS field does not match a configuration of the receiver, e.g., as described below.

In some demonstrative embodiments, in one example, the type value in beacon frame 132 may be configured based on an SSID value, e.g., as described below.

In other embodiments, the type value may include any other SS value, and/or any other type value, which may indicate a type of one or more wireless stations to respond to the beacon frame 132.

In some demonstrative embodiments, the type value may be included, for example, in an Information Element (IE), which may be included as part of a beacon frame, e.g., beacon frame 132, for example, as an optional IE or field.

In some demonstrative embodiments, controller 124 may be configured to control, cause and/or trigger the STA implemented by device 102 to include the IE with the type value in one or more DMG beacons, e.g., beacon frame 132, for example, to indicate a desired type of a STA, which is to send a SSW in response to the DMG beacons, e.g., as described below.

In some demonstrative embodiments, the inclusion of the "Desired type value" field, in beacons may allow, for example, reducing over-the-air (OTA) traffic and/or congestion in SSW responses that attempt to use A-BFT slots following the beacons. Such a behavior may be beneficial, for example, at least in terms of OTA interference and/or client power consumption.

Figure 2:
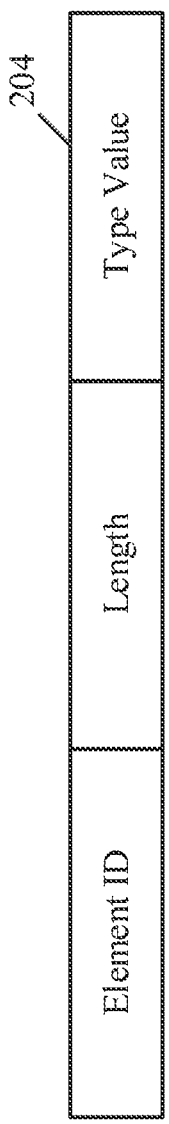
FIG. 2 is a schematic illustration of an Information Element (IE), in accordance with some demonstrative embodiments.

Reference is made to FIG. 2, which schematically illustrates an Information Element (IE) 200 configured to include a type value, in accordance with some demonstrative embodiments.

In some demonstrative embodiments, a device sending a beacon, e.g., beacon frame 132 (FIG. 1), for example, a DMG beacon, may be configured to include IE 200 in the beacon, for example, to indicate a type of one or more wireless stations to respond to the beacon frame. For example, device 102 (FIG. 1) may be configured to generate and/or transmit beacon frame 132 (FIG. 1) including IE 200, and/or device 140 (FIG. 1) may be configured to receive, access and/or process beacon frame 132 (FIG. 1) including IE 200.

In some demonstrative embodiments, IE 200 may be added to a DMG beacon, for example, as an optional IE. For example, device 102 (FIG. 1) may include IE 200 in one or more DMG beacons, for example, to indicate a desired type of a STA, which is to send a SSW in response to the beacon DMG beacon.

In some demonstrative embodiments, IE 200 may include a field 204 configured to include a value ("type value") to indicate a type of one or more wireless stations to respond to the beacon frame including IE 200.

In some demonstrative embodiments, field 204 may be included as part of IE 200, e.g., as shown in FIG. 2. In other embodiments, field 204 may be included as a field or a subfield of the beacon frame, e.g., instead of being included in IE 200.

In some demonstrative embodiments, IE 200 may include an IE configured to indicate a "Desired SSID" IE. For example, a device sending a beacon, e.g., a DMG beacon, for example, device 102 (FIG. 1), may be configured to include IE 200 as an additional "Desired SSID" IE in the DMG beacon.

In some demonstrative embodiments, type value 204 may include may include a value to indicate a desired SS, e.g., a desired SSID, e.g., as described below.

In some demonstrative embodiments, IE 200 may be added to a DMG beacon, e.g., beacon frame 132 (FIG. 1), for example, as an optional IE. For example, device 102 (FIG. 1) may include IE 200 in one or more DMG beacons, for example, to indicate a desired type, e.g., a desired SS type or a desired SSID, corresponding to a STA, which is to send a SSW in response to the beacon.

In some demonstrative embodiments, a STA receiving a DMG beacon with the IE 200, e.g., device 140 (FIG. 1), may be allowed to respond with one or more SSW frames, for example, over a following A-BFT allocation, for example, if the value in field 204 in the received DMG beacon matches a configuration for the STA receiving the DMG beacon.

For example, if field 204 includes a desired SS value, the STA receiving the DMG beacon with the IE 200 may be allowed to respond with one or more SSW frames, e.g., SSW frame 134, for example, over a following A-BFT allocation, for example, if the desired SS value in field 204 of the received DMG beacon matches an SS value configured for the STA receiving the SMG beacon.

In one example, if field 204 includes a desired SSID, the STA receiving the DMG beacon with the IE 200 may be allowed to respond with one or more SSW frames, for example, over a following A-BFT allocation, for example, if the desired SSID in field 204 of the received DMG beacon, matches an SSID value configured for the STA receiving the SMG beacon. For example, the STA receiving the DMG beacon with the IE 200 may be allowed to respond with SSW frames over a following A-BFT allocation, e.g., only if the desired SSID matches its configured SSID value.

In some demonstrative embodiments, a device, e.g., device 140 (FIG. 1), may be configured to selectively respond to a DMG beacon, for example, based on the value 204 included in the DMG beacon. For example, device 140 (FIG. 1) may be configured to select to respond to a DMG beacon including a first type value 204, and/or to select not to respond to a DMG beacon, which does not include the first type value 204, or which includes a second type value, different from the first type value 204.

For example, device 140 (FIG. 1) may be configured to select to respond to a DMG beacon including a first SS value, e.g., if a configuration of the device corresponds the first SS value; and/or to select not to respond to a DMG beacon, which does not include the first SS value, or which includes a second SS value, different from the first SS value, e.g., if the configuration of the device does not correspond to the second SS value.

In one example, if field 204 includes a desired SSID, device 140 (FIG. 1) may be configured to select to respond to a DMG beacon including a first SSID value, and/or to select not to respond to a DMG beacon, which does not include the first SSID value, or which includes a second SSID value, different from the first SSID value.

In one example, if field 204 includes the desired SSID, the STA receiving the DMG beacon may be allowed to answer, for example, if the desired SSID in the DMG beacon includes one or more predefined values.

For example, in case the desired SSID=wildcard SSID (e.g., empty string), then both DMG APs and DMG P2P Group Owners are allowed to answer.

For example, in case the desired SSID=P2P wildcard SSID (e.g., "DIRECT-") then both DMG P2P devices and DMG P2P Group Owners are allowed to answer.

In other embodiments, any other values may be used for field 204 to indicate any other additional or alternative types of stations, which are allowed respond with a SSW to the DMG beacon.

Referring back to FIG. 1, in some demonstrative embodiments, devices 102 and/or 140 may be configured to communicate a SSW frame, e.g., SSW frame 134, including "BSS-type" information, e.g., as described below.

In some demonstrative embodiments, a sender of the SSW frame, e.g., device 140, may be able to use the BSS-type information to signal some classification of the device sending the SSW, and/or may enable a receiver of the SSW frame, e.g., device 102, to use the BSS-type information, for example, in making a more educated decision on whether or not to send a probe request to the sender of the SSW frame, e.g., as described below.

For example, a device initiating an active scan, e.g., device 102, may select to halt the active scan, for example, based on the BSS-type information in a received SSW frame, for example, even without triggering transmission of a probe request frame, e.g., as described below.

In some demonstrative embodiments, controller 154 may be configured to control, cause and/or trigger the STA implemented by device 140 to transmit the SSW frame 134 including a BSS type field to indicate a BSS type, e.g., as described below.

In some demonstrative embodiments, controller 154 may be configured to allow the STA implemented by device 140 to transmit the SSW frame 134 including the BSS type field including a value of one, two, or three, e.g., as described below. In other embodiments, the BSS type field may include any other additional or alternative value.

In some demonstrative embodiments, device 102 may be configured to selectively transmit a probe request 136 to device 140, for example, based on the BSS type field in SSW frame 134, e.g., as described below.

In some demonstrative embodiments, controller 124 may be configured to control, cause and/or trigger the STA implemented by device 102 to select whether or not to transmit probe request 136 to the STA implemented by device 140, for example, based on the BSS type field in SSW frame 134, e.g., as described below.

In some demonstrative embodiments, a device, e.g., device 140, sending an SSW frame ("the sending STA"), for example, in response to a DMG beacon, may include a BSS type of the sending STA, for example, in a SSW Feedback field of the SSW frame, e.g., as described below. In other embodiments, the BSS type field may be included as part of any other field or IE of the SSW frame.

Figure 3:
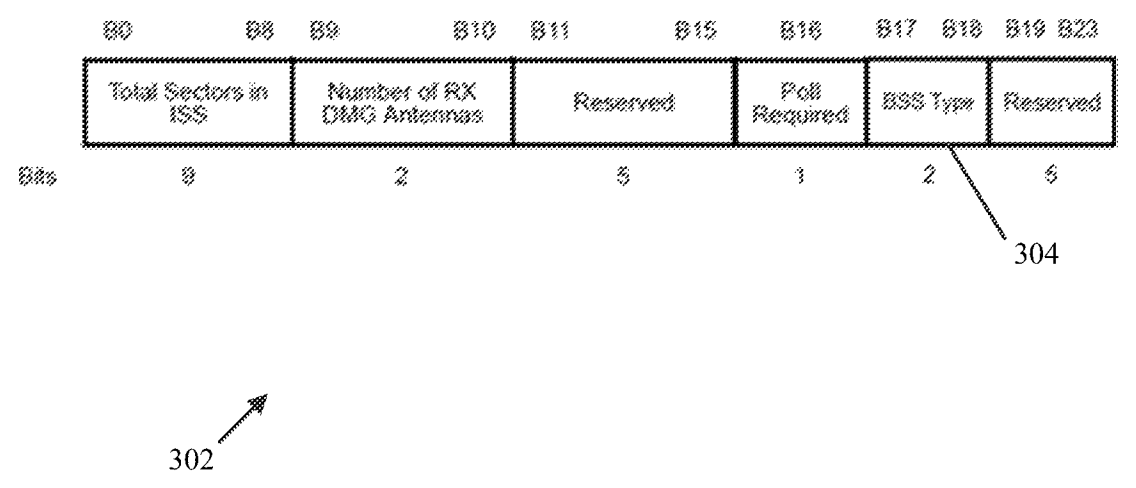

Reference is made to FIG. 3, which schematically illustrates a Sector Sweep Feedback field 302 of an SSW frame, which may be implemented in accordance with some demonstrative embodiments. For example, device 140 (FIG. 1) may be configured to generate and/or transmit SSW frame 134 (FIG. 1) including Sector Sweep Feedback field 302, and/or device 102 (FIG. 1) may receive and/or process SSW frame 134 (FIG. 1) including Sector Sweep Feedback field 302.

In some demonstrative embodiments, the Sector Sweep Feedback field 304 may be configured in compliance with a Sector Sweep Feedback field defined in a IEEE 802.11REVmc Specification. For example, a BSS type subfield 304 may be configured using one or more bits, e.g., two bits of a reserved field of field 304, which may be allocated to carry the BSS type of the sending STA. In other embodiments, the BSS type of the sending STA may be included in any other field and/or using any other number of bits of the Sector Sweep Feedback field 302.

In some demonstrative embodiments, the BSS type field 304 may be configured to carry one or more values, for example, in compliance with an IEEE 802.11EREVmc Specification and/or any other specification, standard and/or protocol.

In some demonstrative embodiments, the sending device, e.g., device 140 (FIG. 1), may be configured to set a value of the BSS type field 304, for example, to a first value, e.g., "3", to indicate a first BSS type, e.g., an infrastructure BSS (infra-BSS); to a second value, e.g., "2", to indicate a second BSS type, e.g., a PBSS; or to a third value, e.g., "1", to indicate a third BSS type, e.g., an IBSS (non-AP, non-PCP). In other embodiments, the sending device may set the BSS type field 304 to any other additional or alternative value and/or to indicate any other additional or alternative BSS type.

In some demonstrative embodiments, a station, e.g., device 102 (FIG. 1), receiving the SSW frame, e.g., SSW frame 134 (FIG. 1), may be configured to determine and/or select whether or not to send a probe request frame, e.g., probe request 136 (FIG. 1), for example, based on the BSS type field 304 of the SSW frame.

In some demonstrative embodiments, a station receiving the SSW frame, e.g., device 102 (FIG. 1), may be configured to determine and/or select whether or not to send a probe request frame, for example, based on a type of STA to be discovered.

In some demonstrative embodiments, the STA, e.g., the STA implemented by device 102 (FIG. 1), receiving a SSW frame, e.g., SSW frame 134 (FIG. 1), shall behave in the following manner based on the received BSS type value, e.g., in BSS type field 304:
1. For BSS type=3—if the STA desires to find DMG APs it will continue with a probe request (Probe-req). Otherwise, it should not send a Probe-req.
2. For BSS type=2—if the STA desires to find DMG P2P group owners it will continue with Probe-req. Otherwise, it should not send a Probe-req.
3. For BSS type=1—if the STA desires to find DMG P2P devices it will continue with Probe-req. Otherwise it should not send a Probe-req.

In some demonstrative embodiments, the STA receiving the SSW frame, e.g., device 102 (FIG. 1), may be configured to perform any one or more additional or alternative operations based on the BSS-type field 304, and/or to select whether or not to send a probe request based on any additional or alternative criteria.

Referring back to FIG. 1, in some demonstrative embodiments, devices 102 and/or 140 may be configured to communicate according to a probe request/response scheme, which may be configured, for example, to enable at least fast and/or efficient completion of a probe/request response exchange, for example, during an active scan, e.g., as described below.

In some demonstrative embodiments, a probe request frame targeting a specific device, for example, any probe request that follows an SSW-feedback and targeting a specific device, may be required to carry an identifier, for example, an address, e.g., a MAC address (Mac-Add), of the specific device. For example, the identifier of the specific device may include, for example, a MAC address of the specific device as indicated in an SSW frame from the specific device, e.g., as described below.

In some demonstrative embodiments, a device receiving a probe-request, which is directed to the device, for example, each device that receives a probe request unicastly directed to it, may be required to reply with a probe-response, for example, even if a requested SSID in the probe request does not match, e.g., as described below.

In some demonstrative embodiments, devices 102 and/or 140 may be configured to communicate according to an active scanning scheme mandating the use of a unicast probe-request and/or mandating a response, e.g., as described below.

In some demonstrative embodiments, mandating a probe response in reply to a unicast probe request, e.g., as described below, may ensure, for example, quick completion of a probe request/response exchange.

In some demonstrative embodiments, a STA, which receives an SSW frame from a peer device, responds with an SSW-feedback frame to the peer device, and desires to send a following probe request to the same peer device shall set a receiver address (RA) field within the probe-request frame to a unicast address of the STA that sent the SSW frame.

In some demonstrative embodiments, device 102 may receive SSW frame 134 from device 140, and may transmit an SSW feedback frame 135 to device 140, e.g., in response to SSW frame 134.

For example, controller 124 may be configured to cause the STA implemented by device 102 to process an SSW frame, e.g., SSW frame 134, from the STA implemented by device 140, and to transmit to the STA implemented by device 140 an SSW feedback frame, e.g., SSW feedback frame 135, in response to the SSW frame.

In some demonstrative embodiments, device 140 may process the SSW feedback frame 135 from device 102, e.g., in response to SSW frame 134.

In some demonstrative embodiments, device 102 may be configured to transmit a probe request, for example, as a unicast transmission to device 140, e.g., as described below.

In some demonstrative embodiments, controller 124 may be configured to cause the STA implemented by device 102 to transmit probe request 136 including an RA field including a unicast address of the STA implemented by device 140.

In some demonstrative embodiments, a STA that receives a probe request frame with an RA matching its specific Mac-Add may be mandated to respond with a probe-response, e.g., as described below.

In some demonstrative embodiments, a STA, e.g., the STA implemented by device 140, may be configured to respond with a probe response, e.g., to always respond with a probe response, to a unicast probe request addressed to the STA, e.g., as described below.

In some demonstrative embodiments, the STA may be configured to respond with the probe response, e.g., to always respond with the probe response, to a probe request, e.g., to any probe request, which includes an RA matching a MAC address of the STA, e.g., as described below.

In some demonstrative embodiments, a station receiving a probe request addressed to a unicast address of the station, may be configured to select to respond to the probe request, for example, while selecting not to respond to a probe request addressed to a broadcast address.

In some demonstrative embodiments, controller 154 may be configured to cause the STA implemented by device 140 to process the probe request 136 including the RA field including the unicast address of the STA implemented by device 140.

In some demonstrative embodiments, controller 154 may be configured to cause the STA implemented by device 140 to transmit to the STA implemented by device 102 a probe response 138 in response to the probe request 136.

In some demonstrative embodiments, controller 154 may be configured to mandate transmission of probe response 138 in response to any probe request 136 with the RA field including the unicast address of the STA implemented by device 140, e.g., as described below.

In some demonstrative embodiments, controller 154 may be configured to mandatorily transmit probe response 138 in response to any probe request, e.g., probe request 136, which includes the RA field including the unicast address of the STA implemented by device 140; and/or to allow the STA implemented by device 140 to select whether or not to respond to a probe request, which includes a broadcast address in the RA field.

In some demonstrative embodiments, controller 124 may be configured to cause the STA implemented by device 102 to transmit probe request 136 including a Service Set Identifier (SSID) value ("the first SSID value"), e.g., as described below.

In some demonstrative embodiments, the first SSID value may include a value to indicate one or more types of STAs to which the STA implemented by device 102 would like to connect, e.g., as described below.

In some demonstrative embodiments, controller 154 may be configured to cause the STA implemented by device 140 to determine whether or not a configuration of the STA implemented by device 140 corresponds to the first SSID value, e.g., as described below.

In some demonstrative embodiments, controller 154 may be configured to cause the STA implemented by device 140 to transmit probe response 138 to the STA implemented by device 102, for example, regardless of whether or not the configuration of the STA implemented by device 140 corresponds to the first SSID value included in probe request 136, e.g., as described below.

In some demonstrative embodiments, controller 154 may be configured to cause the STA implemented by device 140 to transmit probe response 138 to the STA implemented by device 102, for example, even when the configuration of the STA implemented by device 140 does not correspond to the SSID value in the probe request 138.

In some demonstrative embodiments, controller 154 may be configured to cause the STA implemented by device 140 to include in probe response 138 an indication on whether or not the configuration of the STA implemented by device 140 corresponds to the first SSID value included in probe request 136, e.g., as described below.

In some demonstrative embodiments, controller 154 may be configured to cause the STA implemented by device 140 to include in the probe response 138 a predefined SSID value ("the second SSID value") to indicate that the configuration of the STA implemented by device 140 does not correspond to the SSID value in the probe request 134.

In some demonstrative embodiments, the predefined SSID value may include a wildcard SSID value, or an empty string.

In other embodiments, the predefined SSID value may include any other value or string, which may indicate that the configuration of a sender of the probe response, e.g., the STA implemented by device 140, does not correspond to the SSID value in the probe request.

In some demonstrative embodiments, for example, in case the SSID field in the Probe-req does not fit the current configuration of a receiving STA, e.g., the STA implemented by device 140, the receiving STA shall respond with a Probe-resp frame containing an empty SSID (wildcard SSID) value.

For example, one or more of the following cases may include specific cases for the receiving STA responding with an empty SSID:

a. The receiving STA is a DMG AP, which receives a probe-req with SSID=P2P wildcard ("DIRECT-");

b. The receiving STA is a DMG AP, which is configured to be hidden, and which receives a probe-req with any SSID besides its specific configured SSID;

c. The receiving STA is a P2P device, which receives a probe-req with SSID=wildcard SSID (empty string);

d. The receiving STA is a DMG AP or DMG P2P group owner, which receives a probe-req with SSID=non wildcard/P2P wildcard SSID, which is different from the SSID currently configured for the AP/P2P group owner.

In other embodiments, the receiving STA may respond with an empty SSID in one or more other additional or alternative cases and/or based on one or more other additional or alternative criteria.

In some demonstrative embodiments, controller 124 may be configured to cause the STA implemented by device 102 to process probe response 138 from the STA implemented by device 140 including the second SSID value, which may indicate that the configuration of the STA implemented by device 140 does not correspond to the first SSID value, which was included in the probe request 136.

In some demonstrative embodiments, a communication scheme utilizing communication of the beacon frame 132, the SSW frame 134, the probe request 136 and/or the probe response 138, e.g., as described above, may allow a device initiating an active scan, e.g., device 102, to realize the nature of a peer device found during discovery, e.g., device 140, for example, quicker, e.g., in a shorter time and/or while spending less power, and/or to decide earlier on a next discovery action, for example, whether or not to proceed to exchange one or more further communication with the peer device.

In one example, a device running a P2P discovery targeted for finding P2P devices and P2P group owners, e.g., in accordance with a WFA P2P technical specification, may include in a DMG beacon a type value, for example, an SS type value, e.g., a P2P wildcard SSID or another SS type value, which may indicate that only STAs corresponding to the type value are to respond with an SSW frame, for example, in order to prevent responses from DMG APs.

In another example, a device scanning for APs only may include in a DMG beacon a type value, e.g., an SS type value, configured to prevent responses from P2P devices.

In another example, a device initiating an active scan, e.g., device 102, may inspect the BSS type in one or more SSW frames received from one or more peer devices. For example, in case the BSS type is a Personal Basic Service Set (PBSS) or an Independent Basic Service Set (IBSS), the device may select to send a probe-request with SSID=P2P wildcard SSID. For example, in case the BSS type reported is an infrastructure BSS, the device may select to send a probe-request with SSID=wildcard SSID.

Figure 4:
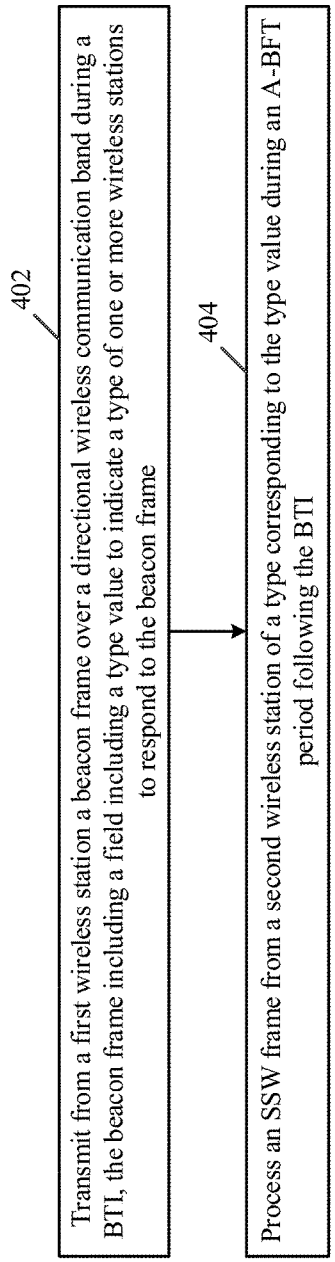
FIG. 4 is a schematic flow-chart illustration of a method of communicating a SSW frame over a directional frequency band, in accordance with some demonstrative embodiments.

Reference is made to FIG. 4, which schematically illustrates a method of communicating a SSW frame over a directional frequency band, in accordance with some demonstrative embodiments. For example, one or more of the operations of the method of FIG. 4 may be performed by one or more elements of a system, e.g., system 100 (FIG. 1), for example, one or more wireless devices, e.g., device 102 (FIG. 1), and/or device 140 (FIG. 1); a controller, e.g., controller 154 (FIG. 1), and/or controller 124 (FIG. 1); a radio, e.g., radio 114 (FIG. 1), and/or radio 144 (FIG. 1); a transmitter, e.g., transmitter 118 (FIG. 1), and/or transmitter 148 (FIG. 1); a receiver e.g., receiver 116 (FIG. 1), and/or receiver 146 (FIG. 1); and/or a message processor, e.g., message processor 128 (FIG. 1), and/or message processor 158 (FIG. 1).

As indicated at block 402, the method may include transmitting from a first wireless station a beacon frame over a directional wireless communication band during a BTI, the beacon frame including a field including a type value to indicate a type of one or more wireless stations to respond to the beacon frame. For example, controller 124 (FIG. 1) may be configured to cause the STA implemented by device 102 (FIG. 1) to transmit beacon frame 132 (FIG. 1) including the type value to indicate a type of one or more wireless stations to respond to the beacon frame 132 (FIG. 1), e.g., as described above.

As indicated at block 404, the method may include processing an SSW frame from a second wireless station of a type corresponding to the type value during an A-BFT period following the BTI. For example, controller 124 (FIG. 1) may be configured to cause the STA implemented by device 102 (FIG. 1) to process SSW frame 134 (FIG. 1) from the STA implemented by device 140 (FIG. 1) during an A-BFT period following the BTI, for example, if the STA implemented by device 140 (FIG. 1) is of a type corresponding to the type value in beacon frame 132 (FIG. 1), e.g., as described above.

Figure 5:
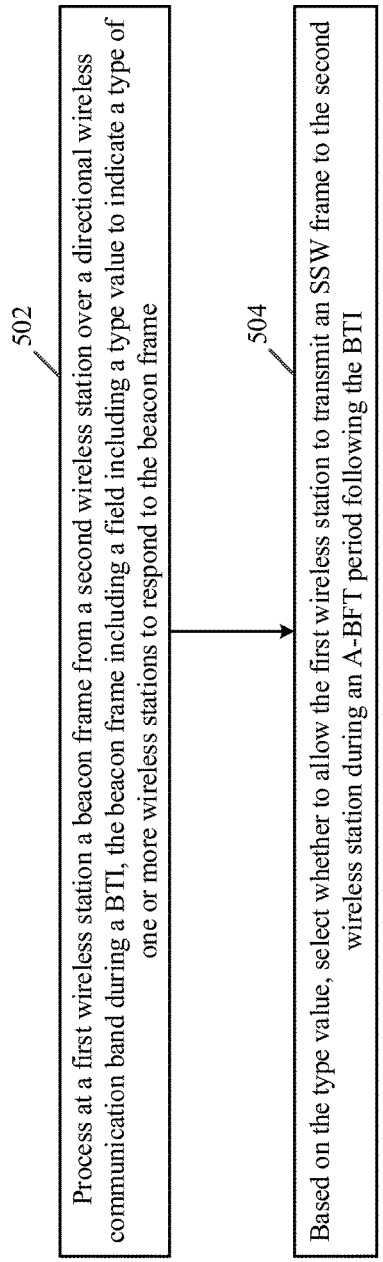
FIG. 5 is a schematic flow-chart illustration of a method of communicating a SSW frame over a directional frequency band, in accordance with some demonstrative embodiments.

Reference is made to FIG. 5, which schematically illustrates a method of communicating a SSW frame over a directional frequency band, in accordance with some demonstrative embodiments. For example, one or more of the operations of the method of FIG. 5 may be performed by one or more elements of a system, e.g., system 100 (FIG. 1), for example, one or more wireless devices, e.g., device 102 (FIG. 1), and/or device 140 (FIG. 1); a controller, e.g., controller 154 (FIG. 1), and/or controller 124 (FIG. 1); a radio, e.g., radio 114 (FIG. 1), and/or radio 144 (FIG. 1); a transmitter, e.g., transmitter 118 (FIG. 1), and/or transmitter 148 (FIG. 1); a receiver e.g., receiver 116 (FIG. 1), and/or receiver 146 (FIG. 1); and/or a message processor, e.g., message processor 128 (FIG. 1), and/or message processor 158 (FIG. 1).

As indicated at block 502, the method may include processing at a first wireless station a beacon frame from a second wireless station over a directional wireless communication band during a BTI, the beacon frame including a field including a type value to indicate a type of one or more wireless stations to respond to the beacon frame. For example, controller 154 (FIG. 1) may be configured to cause the STA implemented by device 140 (FIG. 1) to process beacon frame 132 (FIG. 1) including the type value to indicate a type of one or more wireless stations to respond to the beacon frame 132 (FIG. 1), e.g., as described above.

As indicated at block 504, the method may include, based on the type value, selecting whether to allow the first wireless station to transmit an SSW frame to the second wireless station during an A-BFT period following the BTI. For example, controller 154 (FIG. 1) may be configured to cause the STA implemented by device 140 (FIG. 1) to select, e.g., based on the type value in beacon frame 132 (FIG. 1), whether to allow the STA implemented by device 140 (FIG. 1) to transmit an SSW frame to the STA implemented by device 102 (FIG. 1) during an A-BFT period following the BTI, e.g., as described above.

Figure 6:
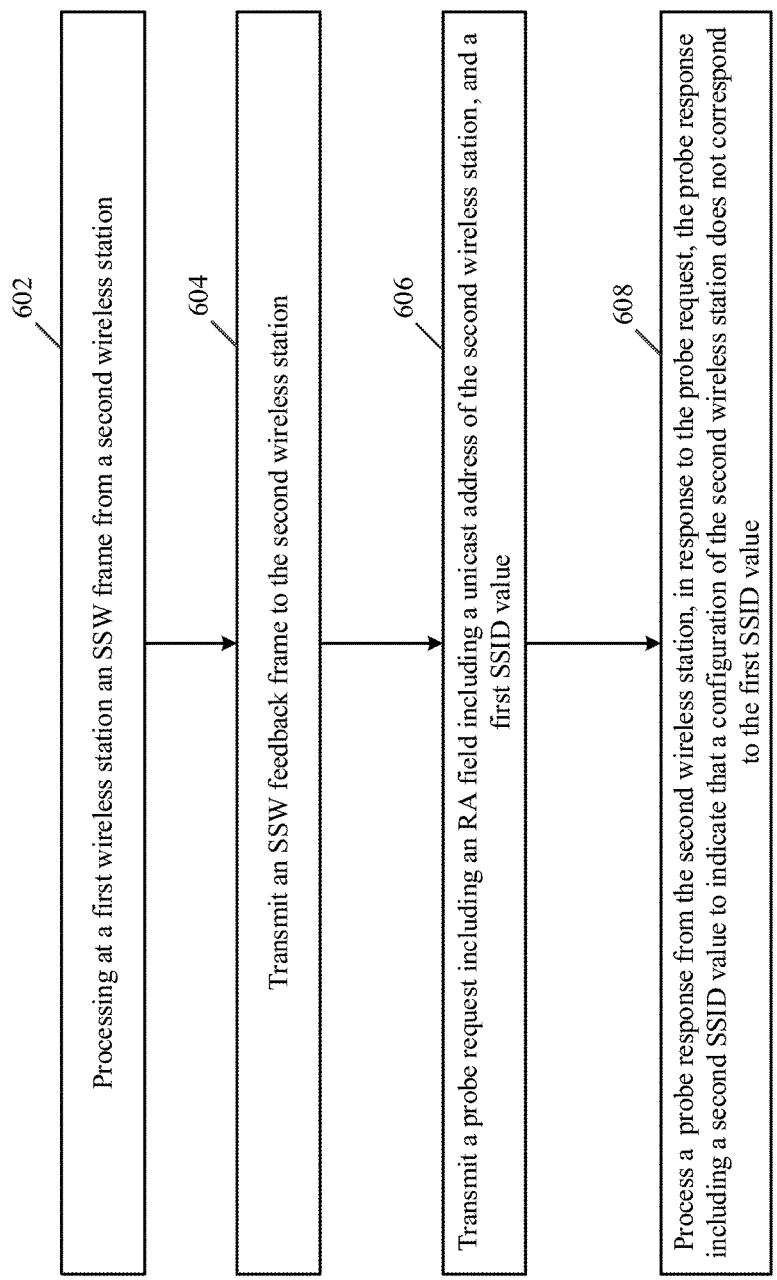
FIG. 6 is a schematic flow-chart illustration of a method of communicating a probe request and a probe response over a directional frequency band, in accordance with some demonstrative embodiments.

Reference is made to FIG. 6, which schematically illustrates a method of communicating a probe request and a probe response over a directional frequency band, in accordance with some demonstrative embodiments. For example, one or more of the operations of the method of FIG. 6 may be performed by one or more elements of a system, e.g., system 100 (FIG. 1), for example, one or more wireless devices, e.g., device 102 (FIG. 1), and/or device 140 (FIG. 1); a controller, e.g., controller 154 (FIG. 1), and/or controller 124 (FIG. 1); a radio, e.g., radio 114 (FIG. 1), and/or radio 144 (FIG. 1); a transmitter, e.g., transmitter 118 (FIG. 1), and/or transmitter 148 (FIG. 1); a receiver e.g., receiver 116 (FIG. 1), and/or receiver 146 (FIG. 1); and/or a message processor, e.g., message processor 128 (FIG. 1), and/or message processor 158 (FIG. 1).

As indicated at block 602, the method may include processing at a first wireless station an SSW frame from a second wireless station. For example, controller 124 (FIG. 1) may be configured to cause the STA implemented by device 102 (FIG. 1) to process SSW frame 134 (FIG. 1) from the STA implemented by device 140 (FIG. 1), e.g., as described above.

As indicated at block 604, the method may include transmitting an SSW feedback frame to the second wireless station. For example, controller 124 (FIG. 1) may be configured to cause the STA implemented by device 102 (FIG. 1) to transmit SSW feedback frame 135 (FIG. 1) to the STA implemented by device 140 (FIG. 1), for example, in response to SSW frame 134 (FIG. 1), e.g., as described above.

As indicated at block 606, the method may include transmitting a probe request including an RA field including a unicast address of the second wireless station, and a first SSID value. For example, controller 124 (FIG. 1) may be configured to cause the STA implemented by device 102 (FIG. 1) to transmit to the STA implemented by device 140 (FIG. 1) the probe request 136 (FIG. 1) including the unicast address of the STA implemented by device 140 (FIG. 1) and the first SSID value, e.g., as described above.

As indicated at block 608, the method may include processing a probe response from the second wireless station, in response to the probe request, the probe response including a second SSID value to indicate that a configuration of the second wireless station does not correspond to the first SSID value. For example, controller 124 (FIG. 1) may be configured to cause the STA implemented by device 102 (FIG. 1) to process the probe response 138 (FIG. 1) including the second SSID value to indicate that a configuration of the STA implemented by device 140 (FIG. 1) does not correspond to the first SSID value in the probe request 136 (FIG. 1), e.g., as described above.

Figure 7:
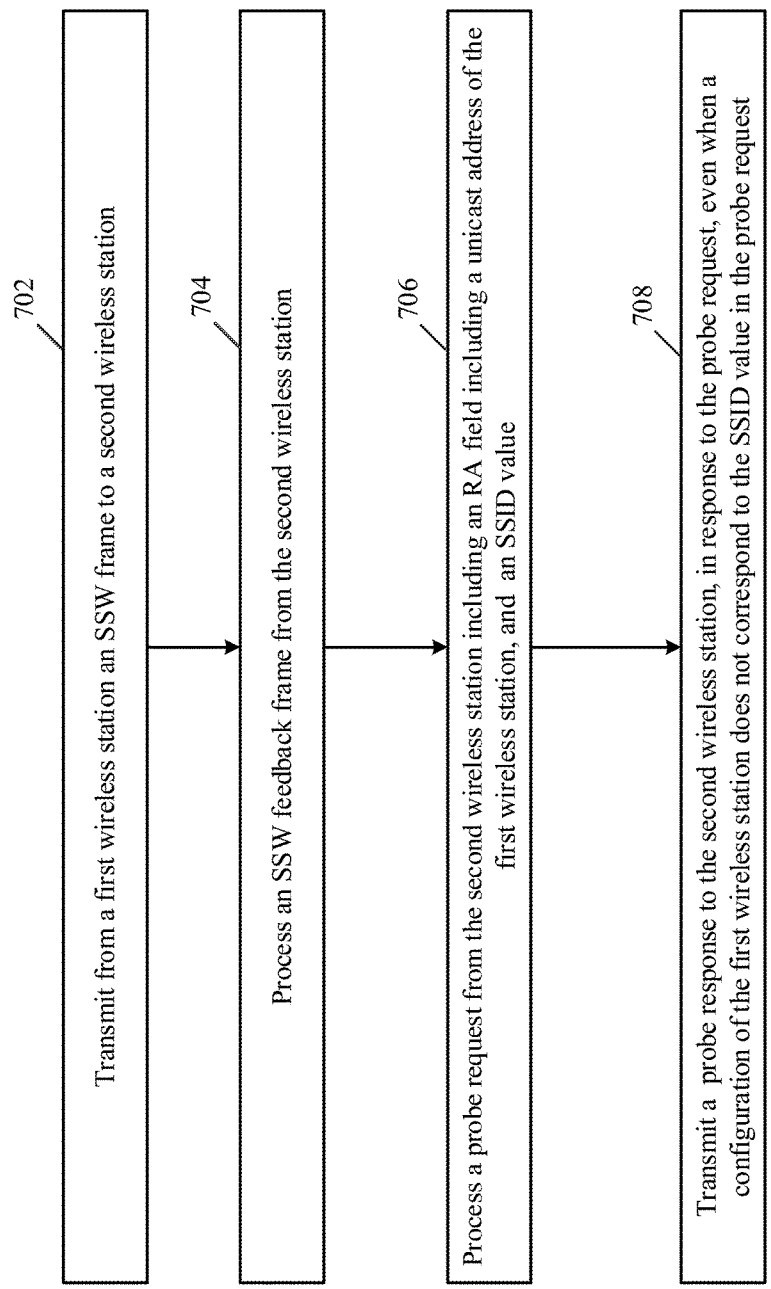
FIG. 7 is a schematic flow-chart illustration of a method of communicating a probe request and a probe response over a directional frequency band, in accordance with some demonstrative embodiments.

Reference is made to FIG. 7, which schematically illustrates a method of communicating a probe request and a probe response over a directional frequency band, in accordance with some demonstrative embodiments. For example, one or more of the operations of the method of FIG. 7 may be performed by one or more elements of a system, e.g., system 100 (FIG. 1), for example, one or more wireless devices, e.g., device 102 (FIG. 1), and/or device 140 (FIG. 1); a controller, e.g., controller 154 (FIG. 1), and/or controller 124 (FIG. 1); a radio, e.g., radio 114 (FIG. 1), and/or radio 144 (FIG. 1); a transmitter, e.g., transmitter 118 (FIG. 1), and/or transmitter 148 (FIG. 1); a receiver e.g., receiver 116 (FIG. 1), and/or receiver 146 (FIG. 1); and/or a message processor, e.g., message processor 128 (FIG. 1), and/or message processor 158 (FIG. 1).

As indicated at block 702, the method may include transmitting from a first wireless station an SSW frame to a second wireless station. For example, controller 154 (FIG. 1) may be configured to cause the STA implemented by device 140 (FIG. 1) to transmit SSW frame 134 (FIG. 1) to the STA implemented by device 102 (FIG. 1), e.g., as described above.

As indicated at block 704, the method may include processing an SSW feedback frame from the second wireless station. For example, controller 154 (FIG. 1) may be configured to cause the STA implemented by device 140 (FIG. 1) to process SSW feedback frame 135 (FIG. 1) from the STA implemented by device 140 (FIG. 1), for example, in response to SSW frame 134 (FIG. 1), e.g., as described above.

As indicated at block 706, the method may include processing a probe request from the second wireless station including an RA field including a unicast address of the first wireless station, and an SSID value. For example, controller 154 (FIG. 1) may be configured to cause the STA implemented by device 140 (FIG. 1) to process the probe request 136 (FIG. 1) including the unicast address of the STA implemented by device 140 (FIG. 1) and the SSID value, e.g., as described above.

As indicated at block 708, the method may include transmitting a probe response to the second wireless station, in response to the probe request, even when a configuration of the first wireless station does not correspond to the SSID value in the probe request. For example, controller 154 (FIG. 1) may be configured to cause the STA implemented by device 140 (FIG. 1) to transmit the probe response 138 (FIG. 1) to the STA implemented by device 102 (FIG. 1), for example, even when a configuration of the STA implemented by device 140 (FIG. 1) does not correspond to the SSID value in the probe request 136 (FIG. 1), e.g., as described above.

Figure 8:
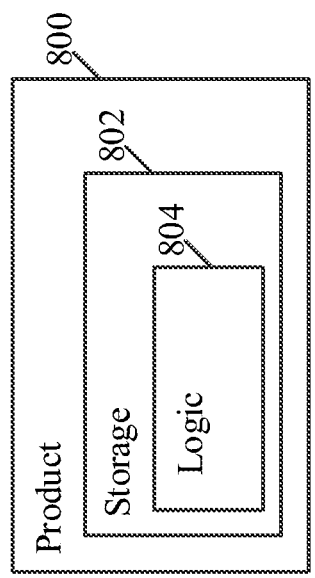
FIG. 8 is a schematic illustration of a product of manufacture, in accordance with some demonstrative embodiments.

Reference is made to FIG. 8, which schematically illustrates a product of manufacture 800, in accordance with some demonstrative embodiments. Product 800 may include one or more tangible computer-readable non-transitory storage media 802, which may include computer-executable instructions, e.g., implemented by logic 804, operable to, when executed by at least one computer processor, enable the at least one computer processor to implement one or more operations at device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), message processor 128 (FIG. 1), and/or message processor 158 (FIG. 1), and/or to perform, trigger and/or implement one or more operations, communications and/or functionalities according to FIGS. 1, 2, 3, 4, 5, 6, and/or 7, and/or one or more operations described herein. The phrase "non-transitory machine-readable medium" is directed to include all computer-readable media, with the sole exception being a transitory propagating signal.

In some demonstrative embodiments, product 800 and/or storage media 802 may include one or more types of computer-readable storage media capable of storing data, including volatile memory, non-volatile memory, removable or non-removable memory, erasable or non-erasable memory, writeable or re-writeable memory, and the like. For example, storage media 802 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 804 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 804 may include, or may be implemented as, software, firmware, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a first wireless station to transmit a beacon frame over a directional wireless communication band during a Beacon Transmission Interval (BTI), the beacon frame comprising a field comprising a type value to indicate a type of one or more wireless stations to respond to the beacon frame; and process a Sector Sweep (SSW) frame from a second wireless station of a type corresponding to the type value during an Association Beamforming Training (A-BFT) period following the BTI.

Example 2 includes the subject matter of Example 1, and optionally, wherein the type value comprises a value to indicate an Access point (AP) station is to respond to the beacon frame.

Example 3 includes the subject matter of Example 1, and optionally, wherein the type value comprises a value to indicate a non-Access point (non-AP) station is to respond to the beacon frame.

Example 4 includes the subject matter of Example 1, and optionally, wherein the type value comprises a value to indicate a Peer-to-Peer (P2P) Group Owner (GO) is to respond to the beacon frame.

Example 5 includes the subject matter of Example 1, and optionally, wherein the type value comprises a value to indicate a Peer-to-Peer (P2P) device is to respond to the beacon frame.

Example 6 includes the subject matter of any one of Examples 1-5, and optionally, wherein the type value comprises a Service Set (SS) value.

Example 7 includes the subject matter of any one of Examples 1-6, and optionally, wherein the beacon frame comprises a discovery beacon frame.

Example 8 includes the subject matter of any one of Examples 1-7, and optionally, wherein the apparatus is configured to cause the first wireless station to transmit the beacon frame during an active scan.

Example 9 includes the subject matter of any one of Examples 1-8, and optionally, wherein the SSW frame comprises a Basic Service Set (BSS) type field to indicate a BSS type.

Example 10 includes the subject matter of Example 9, and optionally, wherein the apparatus is configured to cause the first wireless station to select whether or not to transmit a probe request to the second wireless station based on the BSS type field.

Example 11 includes the subject matter of Example 9 or 10, and optionally, wherein the BSS type field comprises a value of one, two, or three.

Example 12 includes the subject matter of any one of Examples 1-11, and optionally, wherein the apparatus is configured to cause the first wireless station to transmit a probe request comprising a receiver address (RA) field comprising a unicast address of the second wireless station.

Example 13 includes the subject matter of Example 12, and optionally, wherein the apparatus is configured to cause the first wireless station to transmit the probe request comprising a first Service Set Identifier (SSID) value, and to process a probe response from the second wireless station, the probe response comprising a second SSID value to indicate that a configuration of the second wireless station does not correspond to the first SSID value.

Example 14 includes the subject matter of Example 13, and optionally, wherein the second SSID value comprises a wildcard SSID value, or an empty string.

Example 15 includes the subject matter of any one of Examples 1-14, and optionally, wherein the directional wireless communication band comprises a Directional Multi-Gigabit (DMG) band.

Example 16 includes the subject matter of any one of Examples 1-15, and optionally, wherein the first wireless station comprises a Directional Multi-Gigabit (DMG) Station (STA).

Example 17 includes the subject matter of any one of Examples 1-16, and optionally, comprising one or more directional antennas, a memory, and a processor.

Example 18 includes a system of wireless communication comprising a first wireless station, the first wireless station comprising one or more directional antennas; a memory; a processor; and a controller configured to cause the first wireless station to transmit a beacon frame over a directional wireless communication band during a Beacon Transmission Interval (BTI), the beacon frame comprising a field comprising a type value to indicate a type of one or more wireless stations to respond to the beacon frame; and process a Sector Sweep (SSW) frame from a second wireless station of a type corresponding to the type value during an Association Beamforming Training (A-BFT) period following the BTI.

Example 19 includes the subject matter of Example 18, and optionally, wherein the type value comprises a value to indicate an Access point (AP) station is to respond to the beacon frame.

Example 20 includes the subject matter of Example 18, and optionally, wherein the type value comprises a value to indicate a non-Access point (non-AP) station is to respond to the beacon frame.

Example 21 includes the subject matter of Example 18, and optionally, wherein the type value comprises a value to indicate a Peer-to-Peer (P2P) Group Owner (GO) is to respond to the beacon frame.

Example 22 includes the subject matter of Example 18, and optionally, wherein the type value comprises a value to indicate a Peer-to-Peer (P2P) device is to respond to the beacon frame.

Example 23 includes the subject matter of any one of Examples 18-22, and optionally, wherein the type value comprises a Service Set (SS) value.

Example 24 includes the subject matter of any one of Examples 18-23, and optionally, wherein the beacon frame comprises a discovery beacon frame.

Example 25 includes the subject matter of any one of Examples 18-24, and optionally, wherein the controller is configured to cause the first wireless station to transmit the beacon frame during an active scan.

Example 26 includes the subject matter of any one of Examples 18-25, and optionally, wherein the SSW frame comprises a Basic Service Set (BSS) type field to indicate a BSS type.

Example 27 includes the subject matter of Example 26, and optionally, wherein the controller is configured to cause the first wireless station to select whether or not to transmit a probe request to the second wireless station based on the BSS type field.

Example 28 includes the subject matter of Example 26 or 27, and optionally, wherein the BSS type field comprises a value of one, two, or three.

Example 29 includes the subject matter of any one of Examples 18-28, and optionally, wherein the controller is configured to cause the first wireless station to transmit a probe request comprising a receiver address (RA) field comprising a unicast address of the second wireless station.

Example 30 includes the subject matter of Example 29, and optionally, wherein the controller is configured to cause the first wireless station to transmit the probe request comprising a first Service Set Identifier (SSID) value, and to process a probe response from the second wireless station, the probe response comprising a second SSID value to indicate that a configuration of the second wireless station does not correspond to the first SSID value.

Example 31 includes the subject matter of Example 30, and optionally, wherein the second SSID value comprises a wildcard SSID value, or an empty string.

Example 32 includes the subject matter of any one of Examples 18-31, and optionally, wherein the directional wireless communication band comprises a Directional Multi-Gigabit (DMG) band.

Example 33 includes the subject matter of any one of Examples 18-32, and optionally, wherein the first wireless station comprises a Directional Multi-Gigabit (DMG) Station (STA).

Example 34 includes a method to be performed at a first wireless station, the method comprising transmitting a beacon frame over a directional wireless communication band during a Beacon Transmission Interval (BTI), the beacon frame comprising a field comprising a type value to indicate a type of one or more wireless stations to respond to the beacon frame; and processing a Sector Sweep (SSW) frame from a second wireless station of a type corresponding to the type value during an Association Beamforming Training (A-BFT) period following the BTI.

Example 35 includes the subject matter of Example 34, and optionally, wherein the type value comprises a value to indicate an Access point (AP) station is to respond to the beacon frame.

Example 36 includes the subject matter of Example 34, and optionally, wherein the type value comprises a value to indicate a non-Access point (non-AP) station is to respond to the beacon frame.

Example 37 includes the subject matter of Example 34, and optionally, wherein the type value comprises a value to indicate a Peer-to-Peer (P2P) Group Owner (GO) is to respond to the beacon frame.

Example 38 includes the subject matter of Example 34, and optionally, wherein the type value comprises a value to indicate a Peer-to-Peer (P2P) device is to respond to the beacon frame.

Example 39 includes the subject matter of any one of Examples 34-38, and optionally, wherein the type value comprises a Service Set (SS) value.

Example 40 includes the subject matter of any one of Examples 34-39, and optionally, wherein the beacon frame comprises a discovery beacon frame.

Example 41 includes the subject matter of any one of Examples 34-40, and optionally, comprising transmitting the beacon frame during an active scan.

Example 42 includes the subject matter of any one of Examples 34-41, and optionally, wherein the SSW frame comprises a Basic Service Set (BSS) type field to indicate a BSS type.

Example 43 includes the subject matter of Example 42, and optionally, comprising selecting whether or not to transmit a probe request to the second wireless station based on the BSS type field.

Example 44 includes the subject matter of Example 42 or 43, and optionally, wherein the BSS type field comprises a value of one, two, or three.

Example 45 includes the subject matter of any one of Examples 34-44, and optionally, comprising transmitting a probe request comprising a receiver address (RA) field comprising a unicast address of the second wireless station.

Example 46 includes the subject matter of Example 45, and optionally, comprising transmitting the probe request comprising a first Service Set Identifier (SSID) value, and processing a probe response from the second wireless station, the probe response comprising a second SSID value to indicate that a configuration of the second wireless station does not correspond to the first SSID value.

Example 47 includes the subject matter of Example 46, and optionally, wherein the second SSID value comprises a wildcard SSID value, or an empty string.

Example 48 includes the subject matter of any one of Examples 34-47, and optionally, wherein the directional wireless communication band comprises a Directional Multi-Gigabit (DMG) band.

Example 49 includes the subject matter of any one of Examples 34-48, and optionally, wherein the first wireless station comprises a Directional Multi-Gigabit (DMG) Station (STA).

Example 50 includes a product comprising one or more tangible computer-readable non-transitory storage media comprising computer-executable instructions operable to, when executed by at least one computer processor, enable the at least one computer processor to implement operations at a first wireless station, the operations comprising transmitting a beacon frame over a directional wireless communication band during a Beacon Transmission Interval (BTI), the beacon frame comprising a field comprising a type value to indicate a type of one or more wireless stations to respond to the beacon frame; and processing a Sector Sweep (SSW) frame from a second wireless station of a type corresponding to the type value during an Association Beamforming Training (A-BFT) period following the BTI.

Example 51 includes the subject matter of Example 50, and optionally, wherein the type value comprises a value to indicate an Access point (AP) station is to respond to the beacon frame.

Example 52 includes the subject matter of Example 50, and optionally, wherein the type value comprises a value to indicate a non-Access point (non-AP) station is to respond to the beacon frame.

Example 53 includes the subject matter of Example 50, and optionally, wherein the type value comprises a value to indicate a Peer-to-Peer (P2P) Group Owner (GO) is to respond to the beacon frame.

Example 54 includes the subject matter of Example 50, and optionally, wherein the type value comprises a value to indicate a Peer-to-Peer (P2P) device is to respond to the beacon frame.

Example 55 includes the subject matter of any one of Examples 50-54, and optionally, wherein the type value comprises a Service Set (SS) value.

Example 56 includes the subject matter of any one of Examples 50-55, and optionally, wherein the beacon frame comprises a discovery beacon frame.

Example 57 includes the subject matter of any one of Examples 50-56, and optionally, wherein the operations comprise transmitting the beacon frame during an active scan.

Example 58 includes the subject matter of any one of Examples 50-57, and optionally, wherein the SSW frame comprises a Basic Service Set (BSS) type field to indicate a BSS type.

Example 59 includes the subject matter of Example 58, and optionally, wherein the operations comprise selecting whether or not to transmit a probe request to the second wireless station based on the BSS type field.

Example 60 includes the subject matter of Example 58 or 59, and optionally, wherein the BSS type field comprises a value of one, two, or three.

Example 61 includes the subject matter of any one of Examples 50-60, and optionally, wherein the operations comprise transmitting a probe request comprising a receiver address (RA) field comprising a unicast address of the second wireless station.

Example 62 includes the subject matter of Example 61, and optionally, wherein the operations comprise transmitting the probe request comprising a first Service Set Identifier (SSID) value, and processing a probe response from the second wireless station, the probe response comprising a second SSID value to indicate that a configuration of the second wireless station does not correspond to the first SSID value.

Example 63 includes the subject matter of Example 62, and optionally, wherein the second SSID value comprises a wildcard SSID value, or an empty string.

Example 64 includes the subject matter of any one of Examples 50-63, and optionally, wherein the directional wireless communication band comprises a Directional Multi-Gigabit (DMG) band.

Example 65 includes the subject matter of any one of Examples 50-64, and optionally, wherein the first wireless station comprises a Directional Multi-Gigabit (DMG) Station (STA).

Example 66 includes an apparatus of a first wireless station, the apparatus comprising means for transmitting a beacon frame over a directional wireless communication band during a Beacon Transmission Interval (BTI), the beacon frame comprising a field comprising a type value to indicate a type of one or more wireless stations to respond to the beacon frame; and means for processing a Sector Sweep (SSW) frame from a second wireless station of a type corresponding to the type value during an Association Beamforming Training (A-BFT) period following the BTI.

Example 67 includes the subject matter of Example 66, and optionally, wherein the type value comprises a value to indicate an Access point (AP) station is to respond to the beacon frame.

Example 68 includes the subject matter of Example 66, and optionally, wherein the type value comprises a value to indicate a non-Access point (non-AP) station is to respond to the beacon frame.

Example 69 includes the subject matter of Example 66, and optionally, wherein the type value comprises a value to indicate a Peer-to-Peer (P2P) Group Owner (GO) is to respond to the beacon frame.

Example 70 includes the subject matter of Example 66, and optionally, wherein the type value comprises a value to indicate a Peer-to-Peer (P2P) device is to respond to the beacon frame.

Example 71 includes the subject matter of any one of Examples 66-70, and optionally, wherein the type value comprises a Service Set (SS) value.

Example 72 includes the subject matter of any one of Examples 66-71, and optionally, wherein the beacon frame comprises a discovery beacon frame.

Example 73 includes the subject matter of any one of Examples 66-72, and optionally, comprising means for transmitting the beacon frame during an active scan.

Example 74 includes the subject matter of any one of Examples 66-73, and optionally, wherein the SSW frame comprises a Basic Service Set (BSS) type field to indicate a BSS type.

Example 75 includes the subject matter of Example 74, and optionally, comprising means for selecting whether or not to transmit a probe request to the second wireless station based on the BSS type field.

Example 76 includes the subject matter of Example 74 or 75, and optionally, wherein the BSS type field comprises a value of one, two, or three.

Example 77 includes the subject matter of any one of Examples 66-76, and optionally, comprising means for transmitting a probe request comprising a receiver address (RA) field comprising a unicast address of the second wireless station.

Example 78 includes the subject matter of Example 77, and optionally, comprising means for transmitting the probe request comprising a first Service Set Identifier (SSID) value, and processing a probe response from the second wireless station, the probe response comprising a second SSID value to indicate that a configuration of the second wireless station does not correspond to the first SSID value.

Example 79 includes the subject matter of Example 78, and optionally, wherein the second SSID value comprises a wildcard SSID value, or an empty string.

Example 80 includes the subject matter of any one of Examples 66-79, and optionally, wherein the directional wireless communication band comprises a Directional Multi-Gigabit (DMG) band.

Example 81 includes the subject matter of any one of Examples 66-80, and optionally, wherein the first wireless station comprises a Directional Multi-Gigabit (DMG) Station (STA).

Example 82 includes an apparatus comprising logic and circuitry configured to cause a first wireless station to process a beacon frame from a second wireless station over a directional wireless communication band during a Beacon Transmission Interval (BTI), the beacon frame comprising a field comprising a type value to indicate a type of one or more wireless stations to respond to the beacon frame; and based on the type value, select whether to allow the first wireless station to transmit a Sector Sweep (SSW) frame to the second wireless station during an Association Beamforming Training (A-BFT) period following the BTI.

Example 83 includes the subject matter of Example 82, and optionally, wherein the apparatus is configured to allow the first wireless station to transmit the SSW frame to the second wireless station during the A-BFT, when a type of the first wireless station corresponds to the type value.

Example 84 includes the subject matter of Example 82 or 83, and optionally, wherein the type value comprises a value to indicate an Access point (AP) station is to respond to the beacon frame.

Example 85 includes the subject matter of Example 82 or 83, and optionally, wherein the type value comprises a value to indicate a non-Access point (non-AP) station is to respond to the beacon frame.

Example 86 includes the subject matter of Example 82 or 83, and optionally, wherein the type value comprises a value to indicate a Peer-to-Peer (P2P) Group Owner (GO) is to respond to the beacon frame.

Example 87 includes the subject matter of Example 82 or 83, and optionally, wherein the type value comprises a value to indicate a Peer-to-Peer (P2P) device is to respond to the beacon frame.

Example 88 includes the subject matter of any one of Examples 82-87, and optionally, wherein the type value comprises a Service Set (SS) value.

Example 89 includes the subject matter of any one of Examples 82-88, and optionally, wherein the beacon frame comprises a discovery beacon frame.

Example 90 includes the subject matter of any one of Examples 82-89, and optionally, wherein the SSW frame comprises a Basic Service Set (BSS) type field to indicate a BSS type.

Example 91 includes the subject matter of Example 90, and optionally, wherein the BSS type field comprises a value of one, two, or three.

Example 92 includes the subject matter of any one of Examples 82-91, and optionally, wherein the apparatus is configured to cause the first wireless station to transmit a probe response to the second wireless station in response to a probe request comprising a receiver address (RA) field comprising a unicast address of the first wireless station.

Example 93 includes the subject matter of Example 92, and optionally, wherein the apparatus is configured to cause the first wireless station to transmit the probe response, even when a configuration of the first wireless station does not correspond to a Service Set Identifier (SSID) value in the probe request.

Example 94 includes the subject matter of Example 93, and optionally, wherein the apparatus is configured to cause the first wireless station to include in the probe response a predefined SSID value to indicate that the configuration of the first wireless station does not correspond to the SSID value in the probe request.

Example 95 includes the subject matter of Example 94, and optionally, wherein the predefined SSID value comprises a wildcard SSID value, or an empty string.

Example 96 includes the subject matter of any one of Examples 82-95, and optionally, wherein the apparatus is configured to cause the first wireless station to mandatorily transmit a probe response in response to any probe request, which comprises a receiver address (RA) field comprising a unicast address of the first wireless station, and to allow the first wireless station to select whether or not to respond to a probe request, which comprises a broadcast address in the RA field.

Example 97 includes the subject matter of any one of Examples 82-96, and optionally, wherein the directional wireless communication band comprises a Directional Multi-Gigabit (DMG) band.

Example 98 includes the subject matter of any one of Examples 82-97, and optionally, wherein the first wireless station comprises a Directional Multi-Gigabit (DMG) Station (STA).

Example 99 includes the subject matter of any one of Examples 82-98, and optionally, comprising one or more directional antennas, a memory, and a processor.

Example 100 includes a system of wireless communication comprising a first wireless station, the first wireless station comprising one or more directional antennas; a memory; a processor; and a controller configured to cause the first wireless station to process a beacon frame from a second wireless station over a directional wireless communication band during a Beacon Transmission Interval (BTI), the beacon frame comprising a field comprising a type value to indicate a type of one or more wireless stations to respond to the beacon frame; and based on the type value, select whether to allow the first wireless station to transmit a Sector Sweep (SSW) frame to the second wireless station during an Association Beamforming Training (A-BFT) period following the BTI.

Example 101 includes the subject matter of Example 100, and optionally, wherein the controller is configured to allow the first wireless station to transmit the SSW frame to the second wireless station during the A-BFT, when a type of the first wireless station corresponds to the type value.

Example 102 includes the subject matter of Example 100 or 101, and optionally, wherein the type value comprises a value to indicate an Access point (AP) station is to respond to the beacon frame.

Example 103 includes the subject matter of Example 100 or 101, and optionally, wherein the type value comprises a value to indicate a non-Access point (non-AP) station is to respond to the beacon frame.

Example 104 includes the subject matter of Example 100 or 101, and optionally, wherein the type value comprises a value to indicate a Peer-to-Peer (P2P) Group Owner (GO) is to respond to the beacon frame.

Example 105 includes the subject matter of Example 100 or 101, and optionally, wherein the type value comprises a value to indicate a Peer-to-Peer (P2P) device is to respond to the beacon frame.

Example 106 includes the subject matter of any one of Examples 100-105, and optionally, wherein the type value comprises a Service Set (SS) value.

Example 107 includes the subject matter of any one of Examples 100-106, and optionally, wherein the beacon frame comprises a discovery beacon frame.

Example 108 includes the subject matter of any one of Examples 100-107, and optionally, wherein the SSW frame comprises a Basic Service Set (BSS) type field to indicate a BSS type.

Example 109 includes the subject matter of Example 108, and optionally, wherein the BSS type field comprises a value of one, two, or three.

Example 110 includes the subject matter of any one of Examples 100-109, and optionally, wherein the controller is configured to cause the first wireless station to transmit a probe response to the second wireless station in response to a probe request comprising a receiver address (RA) field comprising a unicast address of the first wireless station.

Example 111 includes the subject matter of Example 110, and optionally, wherein the controller is configured to cause the first wireless station to transmit the probe response, even when a configuration of the first wireless station does not correspond to a Service Set Identifier (SSID) value in the probe request.

Example 112 includes the subject matter of Example 111, and optionally, wherein the controller is configured to cause the first wireless station to include in the probe response a predefined SSID value to indicate that the configuration of the first wireless station does not correspond to the SSID value in the probe request.

Example 113 includes the subject matter of Example 112, and optionally, wherein the predefined SSID value comprises a wildcard SSID value, or an empty string.

Example 114 includes the subject matter of any one of Examples 100-113, and optionally, wherein the controller is configured to cause the first wireless station to mandatorily transmit a probe response in response to any probe request, which comprises a receiver address (RA) field comprising a unicast address of the first wireless station, and to allow the first wireless station to select whether or not to respond to a probe request, which comprises a broadcast address in the RA field.

Example 115 includes the subject matter of any one of Examples 100-114, and optionally, wherein the directional wireless communication band comprises a Directional Multi-Gigabit (DMG) band.

Example 116 includes the subject matter of any one of Examples 100-115, and optionally, wherein the first wireless station comprises a Directional Multi-Gigabit (DMG) Station (STA).

Example 117 includes a method to be performed at a first wireless station, the method comprising processing a beacon frame from a second wireless station over a directional wireless communication band during a Beacon Transmission Interval (BTI), the beacon frame comprising a field comprising a type value to indicate a type of one or more wireless stations to respond to the beacon frame; and based on the type value, selecting whether to allow the first wireless station to transmit a Sector Sweep (SSW) frame to the second wireless station during an Association Beamforming Training (A-BFT) period following the BTI.

Example 118 includes the subject matter of Example 117, and optionally, comprising allowing the first wireless station to transmit the SSW frame to the second wireless station during the A-BFT, when a type of the first wireless station corresponds to the type value.

Example 119 includes the subject matter of Example 117 or 118, and optionally, wherein the type value comprises a value to indicate an Access point (AP) station is to respond to the beacon frame.

Example 120 includes the subject matter of Example 117 or 118, and optionally, wherein the type value comprises a value to indicate a non-Access point (non-AP) station is to respond to the beacon frame.

Example 121 includes the subject matter of Example 117 or 118, and optionally, wherein the type value comprises a value to indicate a Peer-to-Peer (P2P) Group Owner (GO) is to respond to the beacon frame.

Example 122 includes the subject matter of Example 117 or 118, and optionally, wherein the type value comprises a value to indicate a Peer-to-Peer (P2P) device is to respond to the beacon frame.

Example 123 includes the subject matter of any one of Examples 117-122, and optionally, wherein the type value comprises a Service Set (SS) value.

Example 124 includes the subject matter of any one of Examples 117-123, and optionally, wherein the beacon frame comprises a discovery beacon frame.

Example 125 includes the subject matter of any one of Examples 117-124, and optionally, wherein the SSW frame comprises a Basic Service Set (BSS) type field to indicate a BSS type.

Example 126 includes the subject matter of Example 125, and optionally, wherein the BSS type field comprises a value of one, two, or three.

Example 127 includes the subject matter of any one of Examples 117-126, and optionally, comprising transmitting a probe response to the second wireless station in response to a probe request comprising a receiver address (RA) field comprising a unicast address of the first wireless station.

Example 128 includes the subject matter of Example 127, and optionally, comprising transmitting the probe response, even when a configuration of the first wireless station does not correspond to a Service Set Identifier (SSID) value in the probe request.

Example 129 includes the subject matter of Example 128, and optionally, wherein the probe response comprises a predefined SSID value to indicate that the configuration of the first wireless station does not correspond to the SSID value in the probe request.

Example 130 includes the subject matter of Example 129, and optionally, wherein the predefined SSID value comprises a wildcard SSID value, or an empty string.

Example 131 includes the subject matter of any one of Examples 117-130, and optionally, comprising mandatorily transmitting a probe response in response to any probe request, which comprises a receiver address (RA) field comprising a unicast address of the first wireless station, and selecting whether or not to respond to a probe request, which comprises a broadcast address in the RA field.

Example 132 includes the subject matter of any one of Examples 117-131, and optionally, wherein the directional wireless communication band comprises a Directional Multi-Gigabit (DMG) band.

Example 133 includes the subject matter of any one of Examples 117-132, and optionally, wherein the first wireless station comprises a Directional Multi-Gigabit (DMG) Station (STA).

Example 134 includes a product comprising one or more tangible computer-readable non-transitory storage media comprising computer-executable instructions operable to, when executed by at least one computer processor, enable the at least one computer processor to implement operations at a first wireless station, the operations comprising processing a beacon frame from a second wireless station over a directional wireless communication band during a Beacon Transmission Interval (BTI), the beacon frame comprising a field comprising a type value to indicate a type of one or more wireless stations to respond to the beacon frame; and based on the type value, selecting whether to allow the first wireless station to transmit a Sector Sweep (SSW) frame to the second wireless station during an Association Beamforming Training (A-BFT) period following the BTI.

Example 135 includes the subject matter of Example 134, and optionally, wherein the operations comprise allowing the first wireless station to transmit the SSW frame to the second wireless station during the A-BFT, when a type of the first wireless station corresponds to the type value.

Example 136 includes the subject matter of Example 134 or 135, and optionally, wherein the type value comprises a value to indicate an Access point (AP) station is to respond to the beacon frame.

Example 137 includes the subject matter of Example 134 or 135, and optionally, wherein the type value comprises a value to indicate a non-Access point (non-AP) station is to respond to the beacon frame.

Example 138 includes the subject matter of Example 134 or 135, and optionally, wherein the type value comprises a value to indicate a Peer-to-Peer (P2P) Group Owner (GO) is to respond to the beacon frame.

Example 139 includes the subject matter of Example 134 or 135, and optionally, wherein the type value comprises a value to indicate a Peer-to-Peer (P2P) device is to respond to the beacon frame.

Example 140 includes the subject matter of any one of Examples 134-139, and optionally, wherein the type value comprises a Service Set (SS) value.

Example 141 includes the subject matter of any one of Examples 134-140, and optionally, wherein the beacon frame comprises a discovery beacon frame.

Example 142 includes the subject matter of any one of Examples 134-141, and optionally, wherein the SSW frame comprises a Basic Service Set (BSS) type field to indicate a BSS type.

Example 143 includes the subject matter of Example 142, and optionally, wherein the BSS type field comprises a value of one, two, or three.

Example 144 includes the subject matter of any one of Examples 134-143, and optionally, wherein the operations comprise transmitting a probe response to the second wireless station in response to a probe request comprising a receiver address (RA) field comprising a unicast address of the first wireless station.

Example 145 includes the subject matter of Example 144, and optionally, wherein the operations comprise transmitting the probe response, even when a configuration of the first wireless station does not correspond to a Service Set Identifier (SSID) value in the probe request.

Example 146 includes the subject matter of Example 145, and optionally, wherein the probe response comprises a predefined SSID value to indicate that the configuration of the first wireless station does not correspond to the SSID value in the probe request.

Example 147 includes the subject matter of Example 146, and optionally, wherein the predefined SSID value comprises a wildcard SSID value, or an empty string.

Example 148 includes the subject matter of any one of Examples 134-147, and optionally, wherein the operations comprise mandatorily transmitting a probe response in response to any probe request, which comprises a receiver address (RA) field comprising a unicast address of the first wireless station, and selecting whether or not to respond to a probe request, which comprises a broadcast address in the RA field.

Example 149 includes the subject matter of any one of Examples 134-148, and optionally, wherein the directional wireless communication band comprises a Directional Multi-Gigabit (DMG) band.

Example 150 includes the subject matter of any one of Examples 134-149, and optionally, wherein the first wireless station comprises a Directional Multi-Gigabit (DMG) Station (STA).

Example 151 includes an apparatus of a first wireless station, the apparatus comprising means for processing a beacon frame from a second wireless station over a directional wireless communication band during a Beacon Transmission Interval (BTI), the beacon frame comprising a field comprising a type value to indicate a type of one or more wireless stations to respond to the beacon frame; and means for, based on the type value, selecting whether to allow the first wireless station to transmit a Sector Sweep (SSW) frame to the second wireless station during an Association Beamforming Training (A-BFT) period following the BTI.

Example 152 includes the subject matter of Example 151, and optionally, comprising means for allowing the first wireless station to transmit the SSW frame to the second wireless station during the A-BFT, when a type of the first wireless station corresponds to the type value.

Example 153 includes the subject matter of Example 151 or 152, and optionally, wherein the type value comprises a value to indicate an Access point (AP) station is to respond to the beacon frame.

Example 154 includes the subject matter of Example 151 or 152, and optionally, wherein the type value comprises a value to indicate a non-Access point (non-AP) station is to respond to the beacon frame.

Example 155 includes the subject matter of Example 151 or 152, and optionally, wherein the type value comprises a value to indicate a Peer-to-Peer (P2P) Group Owner (GO) is to respond to the beacon frame.

Example 156 includes the subject matter of Example 151 or 152, and optionally, wherein the type value comprises a value to indicate a Peer-to-Peer (P2P) device is to respond to the beacon frame.

Example 157 includes the subject matter of any one of Examples 151-156, and optionally, wherein the type value comprises a Service Set (SS) value.

Example 158 includes the subject matter of any one of Examples 151-157, and optionally, wherein the beacon frame comprises a discovery beacon frame.

Example 159 includes the subject matter of any one of Examples 151-158, and optionally, wherein the SSW frame comprises a Basic Service Set (BSS) type field to indicate a BSS type.

Example 160 includes the subject matter of Example 159, and optionally, wherein the BSS type field comprises a value of one, two, or three.

Example 161 includes the subject matter of any one of Examples 151-160, and optionally, comprising means for transmitting a probe response to the second wireless station in response to a probe request comprising a receiver address (RA) field comprising a unicast address of the first wireless station.

Example 162 includes the subject matter of Example 161, and optionally, comprising means for transmitting the probe response, even when a configuration of the first wireless station does not correspond to a Service Set Identifier (SSID) value in the probe request.

Example 163 includes the subject matter of Example 162, and optionally, wherein the probe response comprises a predefined SSID value to indicate that the configuration of the first wireless station does not correspond to the SSID value in the probe request.

Example 164 includes the subject matter of Example 163, and optionally, wherein the predefined SSID value comprises a wildcard SSID value, or an empty string.

Example 165 includes the subject matter of any one of Examples 151-164, and optionally, comprising means for mandatorily transmitting a probe response in response to any probe request, which comprises a receiver address (RA) field comprising a unicast address of the first wireless station, and selecting whether or not to respond to a probe request, which comprises a broadcast address in the RA field.

Example 166 includes the subject matter of any one of Examples 151-165, and optionally, wherein the directional wireless communication band comprises a Directional Multi-Gigabit (DMG) band.

Example 167 includes the subject matter of any one of Examples 151-166, and optionally, wherein the first wireless station comprises a Directional Multi-Gigabit (DMG) Station (STA).

Example 168 includes an apparatus comprising logic and circuitry configured to cause a first wireless station to process a Sector Sweep (SSW) frame from a second wireless station; transmit an SSW feedback frame to the second wireless station; transmit a probe request comprising a receiver address (RA) field comprising a unicast address of the second wireless station, and a first Service Set Identifier (SSID) value; and process a probe response from the second wireless station, in response to the probe request, the probe response comprises a second SSID value to indicate that a configuration of the second wireless station does not correspond to the first SSID value.

Example 169 includes the subject matter of Example 168, and optionally, wherein the second SSID value comprises a wildcard SSID value, or an empty string.

Example 170 includes the subject matter of Example 168 or 169, and optionally, wherein the RA field comprises a Media Access Control (MAC) address of the second wireless station.

Example 171 includes the subject matter of any one of Examples 168-170, and optionally, wherein the directional wireless communication band comprises a Directional Multi-Gigabit (DMG) band.

Example 172 includes the subject matter of any one of Examples 168-171, and optionally, wherein the first wireless station comprises a Directional Multi-Gigabit (DMG) Station (STA).

Example 173 includes the subject matter of any one of Examples 168-172, and optionally, comprising one or more directional antennas, a memory, and a processor.

Example 174 includes a system of wireless communication comprising a first wireless station, the first wireless station comprising one or more directional antennas; a memory; a processor; and a controller configured to cause the first wireless station to process a Sector Sweep (SSW) frame from a second wireless station; transmit an SSW feedback frame to the second wireless station; transmit a probe request comprising a receiver address (RA) field comprising a unicast address of the second wireless station, and a first Service Set Identifier (SSID) value; and process a probe response from the second wireless station, in response to the probe request, the probe response comprises a second SSID value to indicate that a configuration of the second wireless station does not correspond to the first SSID value.

Example 175 includes the subject matter of Example 174, and optionally, wherein the second SSID value comprises a wildcard SSID value, or an empty string.

Example 176 includes the subject matter of Example 174 or 175, and optionally, wherein the RA field comprises a Media Access Control (MAC) address of the second wireless station.

Example 177 includes the subject matter of any one of Examples 174-176, and optionally, wherein the directional wireless communication band comprises a Directional Multi-Gigabit (DMG) band.

Example 178 includes the subject matter of any one of Examples 174-177, and optionally, wherein the first wireless station comprises a Directional Multi-Gigabit (DMG) Station (STA).

Example 179 includes a method to be performed at a first wireless station, the method comprising processing a Sector Sweep (SSW) frame from a second wireless station; transmitting an SSW feedback frame to the second wireless station; transmitting a probe request comprising a receiver address (RA) field comprising a unicast address of the second wireless station, and a first Service Set Identifier (SSID) value; and processing a probe response from the second wireless station, in response to the probe request, the probe response comprises a second SSID value to indicate that a configuration of the second wireless station does not correspond to the first SSID value.

Example 180 includes the subject matter of Example 179, and optionally, wherein the second SSID value comprises a wildcard SSID value, or an empty string.

Example 181 includes the subject matter of Example 179 or 180, and optionally, wherein the RA field comprises a Media Access Control (MAC) address of the second wireless station.

Example 182 includes the subject matter of any one of Examples 179-181, and optionally, wherein the directional wireless communication band comprises a Directional Multi-Gigabit (DMG) band.

Example 183 includes the subject matter of any one of Examples 179-182, and optionally, wherein the first wireless station comprises a Directional Multi-Gigabit (DMG) Station (STA).

Example 184 includes a product comprising one or more tangible computer-readable non-transitory storage media comprising computer-executable instructions operable to, when executed by at least one computer processor, enable the at least one computer processor to implement operations at a first wireless station, the operations comprising processing a Sector Sweep (SSW) frame from a second wireless station; transmitting an SSW feedback frame to the second wireless station; transmitting a probe request comprising a receiver address (RA) field comprising a unicast address of the second wireless station, and a first Service Set Identifier (SSID) value; and processing a probe response from the second wireless station, in response to the probe request, the probe response comprises a second SSID value to indicate that a configuration of the second wireless station does not correspond to the first SSID value.

Example 185 includes the subject matter of Example 184, and optionally, wherein the second SSID value comprises a wildcard SSID value, or an empty string.

Example 186 includes the subject matter of Example 184 or 185, and optionally, wherein the RA field comprises a Media Access Control (MAC) address of the second wireless station.

Example 187 includes the subject matter of any one of Examples 184-186, and optionally, wherein the directional wireless communication band comprises a Directional Multi-Gigabit (DMG) band.

Example 188 includes the subject matter of any one of Examples 184-187, and optionally, wherein the first wireless station comprises a Directional Multi-Gigabit (DMG) Station (STA).

Example 189 includes an apparatus of a first wireless station, the apparatus comprising means for processing a Sector Sweep (SSW) frame from a second wireless station; means for transmitting an SSW feedback frame to the second wireless station; means for transmitting a probe request comprising a receiver address (RA) field comprising a unicast address of the second wireless station, and a first Service Set Identifier (SSID) value; and means for processing a probe response from the second wireless station, in response to the probe request, the probe response comprises a second SSID value to indicate that a configuration of the second wireless station does not correspond to the first SSID value.

Example 190 includes the subject matter of Example 189, and optionally, wherein the second SSID value comprises a wildcard SSID value, or an empty string.

Example 191 includes the subject matter of Example 189 or 190, and optionally, wherein the RA field comprises a Media Access Control (MAC) address of the second wireless station.

Example 192 includes the subject matter of any one of Examples 189-191, and optionally, wherein the directional wireless communication band comprises a Directional Multi-Gigabit (DMG) band.

Example 193 includes the subject matter of any one of Examples 189-192, and optionally, wherein the first wireless station comprises a Directional Multi-Gigabit (DMG) Station (STA).

Example 194 includes an apparatus comprising logic and circuitry configured to cause a first wireless station to transmit a Sector Sweep (SSW) frame to a second wireless station; process an SSW feedback frame from the second wireless station; process a probe request from the second wireless station comprising a receiver address (RA) field comprising a unicast address of the first wireless station, and a Service Set Identifier (SSID) value; and transmit a probe response to the second wireless station, in response to the probe request, even when a configuration of the first wireless station does not correspond to the SSID value in the probe request.

Example 195 includes the subject matter of Example 194, and optionally, wherein the apparatus is configured to cause the first wireless station to include in the probe response a predefined SSID value to indicate that the configuration of the first wireless station does not correspond to the SSID value in the probe request.

Example 196 includes the subject matter of Example 195, and optionally, wherein the predefined SSID value comprises a wildcard SSID value, or an empty string.

Example 197 includes the subject matter of any one of Examples 194-196, and optionally, wherein the apparatus is configured to cause the first wireless station to mandatorily transmit a probe response in response to any probe request, which comprises an RA field comprising a unicast address of the first wireless station, and to allow the first wireless station to select whether or not to respond to a probe request, which comprises a broadcast address in the RA field.

Example 198 includes the subject matter of any one of Examples 194-197, and optionally, wherein the RA field comprises a Media Access Control (MAC) address of the first wireless station.

Example 199 includes the subject matter of any one of Examples 194-198, and optionally, wherein the directional wireless communication band comprises a Directional Multi-Gigabit (DMG) band.

Example 200 includes the subject matter of any one of Examples 194-199, and optionally, wherein the first wireless station comprises a Directional Multi-Gigabit (DMG) Station (STA).

Example 201 includes the subject matter of any one of Examples 194-200, and optionally, comprising one or more directional antennas, a memory, and a processor.

Example 202 includes a system of wireless communication comprising a first wireless station, the first wireless station comprising one or more directional antennas; a memory; a processor; and a controller configured to cause the first wireless station to transmit a Sector Sweep (SSW) frame to a second wireless station; process an SSW feedback frame from the second wireless station; process a probe request from the second wireless station comprising a receiver address (RA) field comprising a unicast address of the first wireless station, and a Service Set Identifier (SSID) value; and transmit a probe response to the second wireless station, in response to the probe request, even when a configuration of the first wireless station does not correspond to the SSID value in the probe request.

Example 203 includes the subject matter of Example 202, and optionally, wherein the controller is configured to cause the first wireless station to include in the probe response a predefined SSID value to indicate that the configuration of the first wireless station does not correspond to the SSID value in the probe request.

Example 204 includes the subject matter of Example 203, and optionally, wherein the predefined SSID value comprises a wildcard SSID value, or an empty string.

Example 205 includes the subject matter of any one of Examples 202-204, and optionally, wherein the controller is configured to cause the first wireless station to mandatorily transmit a probe response in response to any probe request, which comprises an RA field comprising a unicast address of the first wireless station, and to allow the first wireless station to select whether or not to respond to a probe request, which comprises a broadcast address in the RA field.

Example 206 includes the subject matter of any one of Examples 202-205, and optionally, wherein the RA field comprises a Media Access Control (MAC) address of the first wireless station.

Example 207 includes the subject matter of any one of Examples 202-206, and optionally, wherein the directional wireless communication band comprises a Directional Multi-Gigabit (DMG) band.

Example 208 includes the subject matter of any one of Examples 202-207, and optionally, wherein the first wireless station comprises a Directional Multi-Gigabit (DMG) Station (STA).

Example 209 includes a method to be performed at a first wireless station, the method comprising transmitting a Sector Sweep (SSW) frame to a second wireless station; processing an SSW feedback frame from the second wireless station; processing a probe request from the second wireless station comprising a receiver address (RA) field comprising a unicast address of the first wireless station, and a Service Set Identifier (SSID) value; and transmitting a probe response to the second wireless station, in response to the probe request, even when a configuration of the first wireless station does not correspond to the SSID value in the probe request.

Example 210 includes the subject matter of Example 209, and optionally, wherein the probe response comprises a predefined SSID value to indicate that the configuration of the first wireless station does not correspond to the SSID value in the probe request.

Example 211 includes the subject matter of Example 210, and optionally, wherein the predefined SSID value comprises a wildcard SSID value, or an empty string.

Example 212 includes the subject matter of any one of Examples 209-211, and optionally, comprising mandatorily transmitting a probe response in response to any probe request, which comprises an RA field comprising a unicast address of the first wireless station, and selecting whether or not to respond to a probe request, which comprises a broadcast address in the RA field.

Example 213 includes the subject matter of any one of Examples 209-212, and optionally, wherein the RA field comprises a Media Access Control (MAC) address of the first wireless station.

Example 214 includes the subject matter of any one of Examples 209-213, and optionally, wherein the directional wireless communication band comprises a Directional Multi-Gigabit (DMG) band.

Example 215 includes the subject matter of any one of Examples 209-214, and optionally, wherein the first wireless station comprises a Directional Multi-Gigabit (DMG) Station (STA).

Example 216 includes a product comprising one or more tangible computer-readable non-transitory storage media comprising computer-executable instructions operable to, when executed by at least one computer processor, enable the at least one computer processor to implement operations at a first wireless station, the operations comprising transmitting a Sector Sweep (SSW) frame to a second wireless station; processing an SSW feedback frame from the second wireless station; processing a probe request from the second wireless station comprising a receiver address (RA) field comprising a unicast address of the first wireless station, and a Service Set Identifier (SSID) value; and transmitting a probe response to the second wireless station, in response to the probe request, even when a configuration of the first wireless station does not correspond to the SSID value in the probe request.

Example 217 includes the subject matter of Example 216, and optionally, wherein the probe response comprises a predefined SSID value to indicate that the configuration of the first wireless station does not correspond to the SSID value in the probe request.

Example 218 includes the subject matter of Example 217, and optionally, wherein the predefined SSID value comprises a wildcard SSID value, or an empty string.

Example 219 includes the subject matter of any one of Examples 216-218, and optionally, wherein the operations comprise mandatorily transmitting a probe response in response to any probe request, which comprises an RA field comprising a unicast address of the first wireless station, and selecting whether or not to respond to a probe request, which comprises a broadcast address in the RA field.

Example 220 includes the subject matter of any one of Examples 216-219, and optionally, wherein the RA field comprises a Media Access Control (MAC) address of the first wireless station.

Example 221 includes the subject matter of any one of Examples 216-220, and optionally, wherein the directional wireless communication band comprises a Directional Multi-Gigabit (DMG) band.

Example 222 includes the subject matter of any one of Examples 216-221, and optionally, wherein the first wireless station comprises a Directional Multi-Gigabit (DMG) Station (STA).

Example 223 includes an apparatus of a first wireless station, the apparatus comprising means for transmitting a Sector Sweep (SSW) frame to a second wireless station; means for processing an SSW feedback frame from the second wireless station; means for processing a probe request from the second wireless station comprising a receiver address (RA) field comprising a unicast address of the first wireless station, and a Service Set Identifier (SSID) value; and means for transmitting a probe response to the second wireless station, in response to the probe request, even when a configuration of the first wireless station does not correspond to the SSID value in the probe request.

Example 224 includes the subject matter of Example 223, and optionally, wherein the probe response comprises a predefined SSID value to indicate that the configuration of the first wireless station does not correspond to the SSID value in the probe request.

Example 225 includes the subject matter of Example 224, and optionally, wherein the predefined SSID value comprises a wildcard SSID value, or an empty string.

Example 226 includes the subject matter of any one of Examples 223-225, and optionally, comprising means for mandatorily transmitting a probe response in response to any probe request, which comprises an RA field comprising a unicast address of the first wireless station, and selecting whether or not to respond to a probe request, which comprises a broadcast address in the RA field.

Example 227 includes the subject matter of any one of Examples 223-226, and optionally, wherein the RA field comprises a Media Access Control (MAC) address of the first wireless station.

Example 228 includes the subject matter of any one of Examples 223-227, and optionally, wherein the directional wireless communication band comprises a Directional Multi-Gigabit (DMG) band.

Example 229 includes the subject matter of any one of Examples 223-228, and optionally, wherein the first wireless station comprises a Directional Multi-Gigabit (DMG) Station (STA).

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a first wireless station to:
   transmit a beacon frame over a directional wireless communication band during a Beacon Transmission Interval (BTI), the beacon frame comprising a field comprising a type value to indicate a type of one or more wireless stations to respond to the beacon frame; and
   process a Sector Sweep (SSW) frame from a second wireless station of a type corresponding to the type value during an Association Beamforming Training (A-BFT) period following the BTI.

2. The apparatus of claim 1, wherein the type value comprises a value to indicate an Access point (AP) station is to respond to the beacon frame.

3. The apparatus of claim 1, wherein the type value comprises a value to indicate a non-Access point (non-AP) station is to respond to the beacon frame.

4. The apparatus of claim 1, wherein the type value comprises a value to indicate a Peer-to-Peer (P2P) Group Owner (GO) is to respond to the beacon frame.

5. The apparatus of claim 1, wherein the type value comprises a value to indicate a Peer-to-Peer (P2P) device is to respond to the beacon frame.

6. The apparatus of claim 1, wherein the type value comprises a Service Set (SS) value.

7. The apparatus of claim 1, wherein the beacon frame comprises a discovery beacon frame.

8. The apparatus of claim 1 configured to cause the first wireless station to transmit the beacon frame during an active scan.

9. The apparatus of claim 1, wherein the SSW frame comprises a Basic Service Set (BSS) type field to indicate a BSS type.

10. The apparatus of claim 9 configured to cause the first wireless station to select whether or not to transmit a probe request to the second wireless station based on the BSS type field.

11. The apparatus of claim 1 configured to cause the first wireless station to transmit a probe request comprising a receiver address (RA) field comprising a unicast address of the second wireless station.

12. The apparatus of claim 11 configured to cause the first wireless station to transmit the probe request comprising a first Service Set Identifier (SSID) value, and to process a probe response from the second wireless station, the probe response comprising a second SSID value to indicate that a configuration of the second wireless station does not correspond to the first SSID value.

13. The apparatus of claim 1 comprising one or more directional antennas, a memory, and a processor.

14. An apparatus comprising logic and circuitry configured to cause a first wireless station to:
    process a beacon frame from a second wireless station over a directional wireless communication band during a Beacon Transmission Interval (BTI), the beacon frame comprising a field comprising a type value to indicate a type of one or more wireless stations to respond to the beacon frame; and
    based on the type value, select whether to allow the first wireless station to transmit a Sector Sweep (SSW) frame to the second wireless station during an Association Beamforming Training (A-BFT) period following the BTI.

15. The apparatus of claim 14 configured to allow the first wireless station to transmit the SSW frame to the second wireless station during the A-BFT, when a type of the first wireless station corresponds to the type value.

16. The apparatus of claim 14 configured to cause the first wireless station to transmit a probe response to the second wireless station in response to a probe request comprising a receiver address (RA) field comprising a unicast address of the first wireless station.

17. The apparatus of claim 16 configured to cause the first wireless station to transmit the probe response, even when a configuration of the first wireless station does not correspond to a Service Set Identifier (SSID) value in the probe request.

18. The apparatus of claim 17 configured to cause the first wireless station to include in the probe response a predefined SSID value to indicate that the configuration of the first wireless station does not correspond to the SSID value in the probe request.

19. The apparatus of claim 14 configured to cause the first wireless station to mandatorily transmit a probe response in response to any probe request, which comprises a receiver address (RA) field comprising a unicast address of the first wireless station, and to allow the first wireless station to select whether or not to respond to a probe request, which comprises a broadcast address in the RA field.

20. The apparatus of claim 14 comprising one or more directional antennas, a memory, and a processor.

21. A product comprising one or more tangible computer-readable non-transitory storage media comprising computer-executable instructions operable to, when executed by at least one computer processor, enable the at least one computer processor to implement operations at a first wireless station, the operations comprising:
    processing a Sector Sweep (SSW) frame from a second wireless station;
    transmitting an SSW feedback frame to the second wireless station;
    transmitting a probe request comprising a receiver address (RA) field comprising a unicast address of the second wireless station, and a first Service Set Identifier (SSID) value; and
    processing a probe response from the second wireless station, in response to the probe request, the probe response comprises a second SSID value to indicate that a configuration of the second wireless station does not correspond to the first SSID value.

22. The product of claim 21, wherein the second SSID value comprises a wildcard SSID value, or an empty string.

23. A product comprising one or more tangible computer-readable non-transitory storage media comprising computer-executable instructions operable to, when executed by at least one computer processor, enable the at least one computer processor to implement operations at a first wireless station, the operations comprising:
    transmitting a Sector Sweep (SSW) frame to a second wireless station;
    processing an SSW feedback frame from the second wireless station;
    processing a probe request from the second wireless station comprising a receiver address (RA) field comprising a unicast address of the first wireless station, and a Service Set Identifier (SSID) value; and
    transmitting a probe response to the second wireless station, in response to the probe request, even when a configuration of the first wireless station does not correspond to the SSID value in the probe request.

24. The product of claim 23, wherein the probe response comprises a predefined SSID value to indicate that the configuration of the first wireless station does not correspond to the SSID value in the probe request.

25. The product of claim 23, wherein the operations comprise mandatorily transmitting a probe response in response to any probe request, which comprises an RA field comprising a unicast address of the first wireless station, and selecting whether or not to respond to a probe request, which comprises a broadcast address in the RA field.

* * * * *